US011032770B2

(12) United States Patent
Li et al.

(10) Patent No.: US 11,032,770 B2
(45) Date of Patent: Jun. 8, 2021

(54) WAKE-UP-RADIO DISCOVERY FRAME

(71) Applicant: Apple Inc., Cupertino, CA (US)

(72) Inventors: Guoqing Li, Cupertino, CA (US); Veerendra Boodannavar, Sunnyvale, CA (US); Zheng Zeng, Mountain View, CA (US); Yong Liu, Campbell, CA (US); Christiaan A. Hartman, San Jose, CA (US); Jarkko L. Kneckt, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 16/245,323

(22) Filed: Jan. 11, 2019

(65) Prior Publication Data

US 2019/0223101 A1 Jul. 18, 2019

Related U.S. Application Data

(60) Provisional application No. 62/617,638, filed on Jan. 16, 2018, provisional application No. 62/630,708, (Continued)

(51) Int. Cl.
*H04W 52/02* (2009.01)
*H04W 8/00* (2009.01)
(Continued)

(52) U.S. Cl.
CPC ....... *H04W 52/0229* (2013.01); *H04W 8/005* (2013.01); *H04W 52/0206* (2013.01); *H04W 76/11* (2018.02); *H04W 84/12* (2013.01)

(58) Field of Classification Search
CPC .. H04W 52/02; H04W 52/0203; H04W 84/12
See application file for complete search history.

(56) References Cited

U.S. PATENT DOCUMENTS 9,749,955 B2 8/2017 Min
9,801,126 B2 10/2017 Kennedy
(Continued)

FOREIGN PATENT DOCUMENTS

KR 10-1012683 B 2/2011
KR 10-2011-0069671 A 6/2011
(Continued)

OTHER PUBLICATIONS

Notice of Preliminary Rejection, Korean Patent Application No. 10-2019-0016043, dated Dec. 6, 2019, eight pages.
(Continued)

*Primary Examiner* — Hassan A Phillips
*Assistant Examiner* — Prenell P Jones
(74) *Attorney, Agent, or Firm* — Kowert, Hood, Munyon, Rankin & Goetzel, P.C.

(57) ABSTRACT

An interface circuit in an electronic device (such as an access point) may provide a wake-up-radio (WUR) discovery frame for a recipient electronic device, where the WUR discovery frame includes an operating class of a wireless local area network (WLAN) associated with the electronic device. The operating class may specify a regulatory domain and a channel set of the WLAN. Moreover, the WUR discovery frame may include an index of a channel in the channel set. Furthermore, the WUR discovery frame may include a compressed or a partial identifier associated with the electronic device or the WLAN. The amount of compression may be based at least in part on a communication environment of the electronic device, such as a number of electronic devices, or a number of neighboring WLANs. Thus, the WUR discovery frame may have a variable size or length.

20 Claims, 17 Drawing Sheets

Related U.S. Application Data filed on Feb. 14, 2018, provisional application No. 62/631,000, filed on Feb. 15, 2018.

(51) Int. Cl.
*H04W 76/11* (2018.01)
*H04W 84/12* (2009.01)

(56) References Cited

U.S. PATENT DOCUMENTS

| | | | |
|---|---|---|---|
| 2006/0072542 A1* | 4/2006 | Sinnreich | H04L 12/2854 370/351 |
| 2016/0057605 A1 | 2/2016 | Shellhammer | |
| 2016/0057703 A1 | 2/2016 | Benoit | |
| 2017/0055290 A1* | 2/2017 | Lv | H04L 5/0053 |
| 2018/0084499 A1 | 3/2018 | Qi | |
| 2018/0288703 A1* | 10/2018 | Sun | H04W 52/0229 |
| 2019/0045444 A1* | 2/2019 | Huang | H04W 52/0229 |
| 2019/0045445 A1* | 2/2019 | Huang | H04L 69/22 |
| 2019/0082390 A1* | 3/2019 | Azizi | H04L 5/0007 |
| 2019/0116554 A1* | 4/2019 | Kristem | H04L 27/2675 |
| 2019/0174413 A1* | 6/2019 | Huang | H04W 52/0212 |
| 2019/0364505 A1* | 11/2019 | Wang | H04W 52/0235 |

FOREIGN PATENT DOCUMENTS

| | | |
|---|---|---|
| KR | 10-2015-000879 B | 1/2015 |
| KR | 10-2015-0008792 A | 1/2015 |
| KR | 10-1787293 B | 10/2017 |
| WO | WO 2018/071095 A1 | 4/2018 |

OTHER PUBLICATIONS

Extended European Search Report, European Application No. 19156618.1, dated May 31, 2019, eight pages.

Yunbo Han, et al.; "WUR Security Proposal"; IEEE 802.11-17/0660r0; May 8, 2017; nine pages.

Minyoung Park, et al., Intel Corporation, "Proposal for LP-WUR (Low-Power Wake-Up Receiver) Study Group," IEEE 802.11-1610605r3, May 17, 2016, 14 pages.

Notice of Allowance from Korean Application No. dated Jun. 16, 2020, 3 pages.

* cited by examiner

WAKE-UP-RADIO DISCOVERY FRAME

CROSS-REFERENCE TO RELATED APPLICATION

This application claims the benefit of U.S. Provisional Application No. 62/617,638, entitled "Wake-Up Radio Discovery Frame," by Veerendra Boodannavar, et al., filed Jan. 16, 2018, U.S. Provisional Application No. 62/630,708, entitled "Wake-Up Radio Discovery Frame," by Guoqing Li, et al., filed Feb. 14, 2018, and U.S. Provisional Application No. 62/631,000, entitled "Wake-Up Radio Discovery Frame," by Guoqing Li, et al., filed Feb. 15, 2018, the contents of each of which are hereby incorporated by reference.

FIELD

The described embodiments relate, generally, to wireless communications among electronic devices, and techniques for communicating channel information and/or access-point information to a wake-up radio (WUR) in a WUR discovery frame.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device (which is sometimes referred to as a 'recipient electronic device', a 'station' or STA, and which is other than an access point) that communicates using wireless communication in a WLAN may consume a significant amount of power.

In order to address this challenge, a new radio technology called Low Power Wake Up Radio or Wake-Up Radio (WUR) is being considered. The WUR may be a companion to the main Wi-Fi radio in the electronic device (which is sometimes referred to as a 'primary connectivity radio' or PCR). The WUR can operate using relatively less power than the PCR, which, e.g., may be used for data communication. Notably, by using the WUR, the electronic device may turn off its PCR and may selectively wake up the PCR in response to the WUR receiving an WUR frame or packet from an access point. For example, the access point may send the WUR frame when there is a down-link packet for the electronic device. Then, based at least in part on information included in the WUR frame, the WUR may selectively wake up or transition the PCR in the electronic device from a lower-power mode to a relatively higher-power mode.

Nonetheless, there are still use cases in which the PCR consumes significant power and/or adversely impacts the communication performance. For example, an electronic device may sometime scan through multiple channels for nearby access points, and/or may use the measured wireless signal strength for improved location services. However, scanning on the PCR consumes more power than the WUR. In addition, scanning on the PCR may conflict with regular data exchange.

Moreover, electronic devices may sometimes scan for roaming purposes. For example, a roam scan may be triggered when the link quality degrades. However, a roam scan takes time because the roam scan is typically performed on multiple channels, and on each channel the electronic device either conducts an active scan during which it sends a probe request and typically stays awake until it receives a probe response, or a passive scan during which it dwells on each channel for at least a beacon interval in order to receive a beacon. Therefore, scanning through multiple channels can introduce roaming latency and consumes power. In addition, a roam scan may conflict with regular data exchange.

SUMMARY

A first group of embodiments relates to a recipient electronic device that performs additional discovery. This recipient electronic device may include a node that can be communicatively coupled to an antenna, and an interface circuit communicatively coupled to the node and that communicates with an electronic device. Moreover, the interface circuit may include a PCR and a WUR that at least selectively transition the PCR from a lower-power mode to a higher power operating mode. During operation, the WUR may receive, from the node, a WUR discovery frame associated with the electronic device, where the WUR discovery frame includes an identifier of a wireless local area network (WLAN) that includes the electronic device and a channel associated with the WLAN. Then, the WUR may selectively transition the PCR from the lower-power mode to the higher-power mode in response to receiving the WUR discovery frame. When the identifier is not included in a list of known identifiers stored in the recipient electronic device, the PCR may perform, based at least in part on the identifier and the channel, additional discovery associated with the electronic device without performing a full scan.

Alternatively or additionally, during operation the WUR may receive, from the node, the WUR discovery frame associated with the electronic device, where the WUR discovery frame includes an identifier of an operating class of a wireless local area network (WLAN) that includes the electronic device, and where the operating class specifies a regulatory domain and a channel set of the WLAN. Then, the WUR may selectively transition the PCR from the lower-power mode to the higher-power mode in response to receiving the WUR discovery frame.

Moreover, the WUR may perform additional discovery associated with the electronic device, where the additional discovery includes a scan for at least a channel associated with the WLAN based at least in part on the channel set.

In some embodiments, the WUR may receive, from the node, the WUR discovery frame associated with the electronic device, where the WUR discovery frame includes an identifier of an operating class of a wireless local area network (WLAN) that includes the electronic device and an index of a channel in a channel set of the WLAN, and where the operating class specifies a regulatory domain and the channel set of the WLAN. Then, the WUR may selectively transition the PCR from the lower-power mode to the higher-power mode in response to receiving the WUR discovery frame. Moreover, the WUR may perform additional discovery associated with the electronic device based at least in part on the channel.

Note that the electronic device may be or may include an access point.

Moreover, the identifier may be or may include a service set identifier (SSID).

Furthermore, the WUR discovery frame may be compatible with an IEEE 802.11 communication protocol.

Additionally, the WUR discovery frame may have a different length than another WUR discovery frame associated with the electronic device.

Other embodiments provide an interface circuit in the recipient electronic device.

Other embodiments provide the electronic device.

Other embodiments provide a computer-readable storage medium for use with the interface circuit in the recipient electronic device or the electronic device. When program instructions stored in the computer-readable storage medium are executed by the interface circuit, the program instructions may cause the recipient electronic device or the electronic device to perform at least some of the aforementioned operations of the interface circuit in the recipient electronic device or the electronic device.

Other embodiments provide a method. The method includes at least some of the aforementioned operations performed by the interface circuit in the recipient electronic device or the electronic device.

A second group of embodiments relates to a recipient electronic device that makes a roaming decision. This recipient electronic device may include a node that can be communicatively coupled to an antenna, and an interface circuit communicatively coupled to the node and that communicates with an electronic device. Moreover, the interface circuit may include a PCR and a WUR that at least selectively transition the PCR from a lower-power mode to a higher power operating mode. During operation, the WUR may receive, from the node, a WUR discovery frame associated with the electronic device, where the WUR discovery frame includes an identifier of a WLAN associated with the electronic device and that the recipient electronic device previously joined. Moreover, the recipient electronic device may make a roaming decision based at least in part on the identifier.

Note that the electronic device may be or may include an access point.

Moreover, the identifier may be or may include a SSID.

Furthermore, the WUR discovery frame may be compatible with an IEEE 802.11 communication protocol.

Other embodiments provide an interface circuit in the recipient electronic device.

Other embodiments provide the electronic device.

Other embodiments provide a computer-readable storage medium for use with the interface circuit in the recipient electronic device or the electronic device. When program instructions stored in the computer-readable storage medium are executed by the interface circuit, the program instructions may cause the recipient electronic device or the electronic device to perform at least some of the aforementioned operations of the interface circuit in the recipient electronic device or the electronic device.

Other embodiments provide a method. The method includes at least some of the aforementioned operations performed by the interface circuit in the recipient electronic device or the electronic device.

A third group of embodiments relates to a recipient electronic device that provides a transmit identifier (TXID) and a received signal strength. This recipient electronic device may include a node that can be communicatively coupled to an antenna, and an interface circuit communicatively coupled to the node and that communicates with an electronic device. Moreover, the interface circuit may include a PCR and a WUR that at least selectively transition the PCR from a lower-power mode to a higher power operating mode. During operation, the WUR may receive, from the node, a WUR discovery frame associated with the electronic device, where the WUR discovery frame includes the TXID associated with the electronic device. Then, the WUR may determine the received signal strength associated with the electronic device based at least in part on wireless signals corresponding to the WUR discovery frame. Moreover, the WUR may provide the TXID and the received signal strength to a component in the recipient electronic device that is associated with a location service.

Note that the electronic device may be or may include an access point.

Moreover, the WUR discovery frame may be compatible with an IEEE 802.11 communication protocol.

Furthermore, the TXID may be or may include a basic service set identifier (BSSID).

Other embodiments provide an interface circuit in the recipient electronic device.

Other embodiments provide the electronic device.

Other embodiments provide a computer-readable storage medium for use with the interface circuit in the recipient electronic device or the electronic device. When program instructions stored in the computer-readable storage medium are executed by the interface circuit, the program instructions may cause the recipient electronic device or the electronic device to perform at least some of the aforementioned operations of the interface circuit in the recipient electronic device or the electronic device.

Other embodiments provide a method. The method includes at least some of the aforementioned operations performed by the interface circuit in the recipient electronic device or the electronic device.

A fourth group of embodiments relates to a recipient electronic device that receives a WUR discovery frame. This recipient electronic device may include a node that can be communicatively coupled to an antenna, and an interface circuit communicatively coupled to the node and that communicates with an electronic device. Moreover, the interface circuit may include a PCR and a WUR that at least selectively transition the PCR from a lower-power mode to a higher power operating mode. During operation, the WUR may receive, from the node, a WUR discovery frame associated with the electronic device, where the WUR discovery frame includes a compressed or a partial identifier associated with the electronic device or a WLAN that includes the electronic device. For example, the compressed or partial identifier may be included in a payload field.

Note that the electronic device may be or may include an access point.

Moreover, the identifier may be or may include a compressed or partial SSID.

Furthermore, the WUR discovery frame may be compatible with an IEEE 802.11 communication protocol.

In some embodiments, the identifier is compressed using a hash function.

Alternatively or additionally, the identifier may be jointly compressed with additional information. Moreover, the WUR discovery frame may include a bitmap and the compressed or the partial identifier may be specified by at least a bit in the bitmap.

Additionally, an amount of compression or reduction of the compressed or partial identifier may be based at least in part on a communication environment that includes the recipient electronic device. Moreover, the WUR may selectively transition the PCR from a lower-power mode to a higher-power mode in response to receiving the WUR discovery frame. Note that the communication environment may include: a number of electronic devices, and/or a number of neighboring WLANs. Furthermore, the communication environment may include an estimated identifier collision probability between the compressed or the partial identifier and an identifier of one of the electronic devices or the WLANs.

In some embodiments, the WUR discovery frame has a length that is different from a length of another WUR discovery frame associated with the electronic device.

Other embodiments provide the electronic device. This electronic device may include a node that can be communicatively coupled to an antenna, and an interface circuit communicatively coupled to the node and that communicates with the recipient electronic device. During operation, the interface circuit may provide, to the node, the WUR discovery frame for the recipient electronic device, where the WUR discovery frame includes a payload field with the compressed or the partial identifier associated with the electronic device or the WLAN that includes the electronic device.

Still other embodiments provide an interface circuit in the recipient electronic device.

Still other embodiments provide the electronic device.

Still other embodiments provide a computer-readable storage medium for use with the interface circuit in the recipient electronic device or the electronic device. When program instructions stored in the computer-readable storage medium are executed by the interface circuit, the program instructions may cause the recipient electronic device or the electronic device to perform at least some of the aforementioned operations of the interface circuit in the recipient electronic device or the electronic device.

Other embodiments provide a method. The method includes at least some of the aforementioned operations performed by the interface circuit in the recipient electronic device or the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
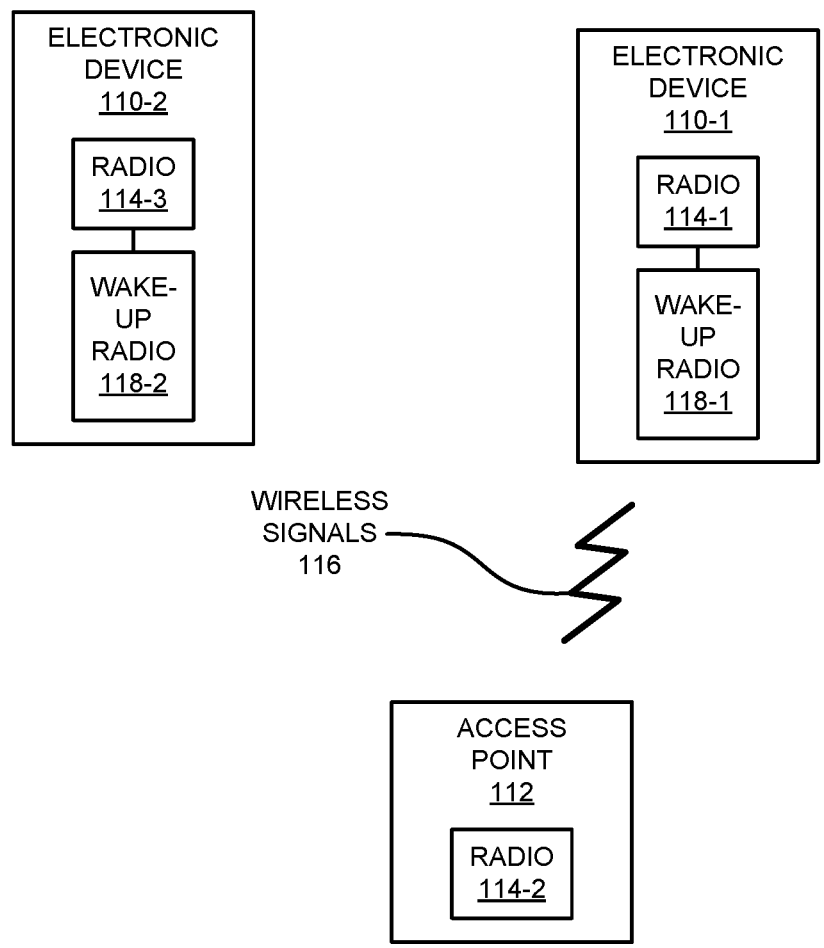
FIG. 1 is a block diagram illustrating an example of electronic devices communicating wirelessly.

Table 1 provides an example of operating classes.

Note that like reference numerals refer to corresponding parts throughout the drawings. Moreover, multiple instances of the same part are designated by a common prefix separated from an instance number by a dash.

DETAILED DESCRIPTION

An interface circuit in an electronic device (such as an access point) may provide a WUR discovery frame or packet for a recipient electronic device. Notably, during operation the interface circuit may provide the WUR discovery frame for the recipient electronic device. This WUR discovery frame may include an operating class of a WLAN associated with the electronic device, and the operating class may specify a regulatory domain and a channel set of the WLAN. Moreover, the WUR discovery frame may include an index of a channel in the channel set. Furthermore, the WUR discovery frame may include a compressed or a partial identifier associated with the electronic device or the WLAN. The amount of compression may be based at least in part on a communication environment of the electronic device, such as a number of electronic devices, or a number of neighboring WLANs. Thus, the WUR discovery frame may have a variable size or length.

In response to receiving the WUR discovery frame, a WUR in another interface circuit in the recipient electronic device may selectively transition a PCR in the interface circuit from a lower-power mode to a higher-power mode. For example, the WUR may selectively transition the PCR when the WUR discovery frame specifies the recipient electronic device. Moreover, the WUR may perform additional discovery associated with the electronic device, where the additional discovery includes a scan for at least a channel associated with the WLAN based at least in part on the channel set. Alternatively, when the WUR discovery frame includes the index of the channel, the additional discovery associated with the electronic device may be based at least in part on the channel.

By providing the operating-class information, this communication technique may reduce congestion in a medium in a wireless environment of the electronic device while maintaining the power savings associated with the use of the wake-up radio. For example, the communication technique may facilitate more efficient scanning. In addition, the communication technique may provide a variable-length WUR discovery frame. Consequently, the communication technique may improve the communication performance and, thus, the user experience when using the electronic device or the recipient electronic device. Therefore, the communication technique may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11BA and/or IEEE 802.11ax, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly in accordance with some embodiments. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 17, electronic devices 110 and access point 112 may include subsystems, such as any/all of: a networking subsystem, a memory subsystem, and/or a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-10, radio 114-1 may receive wireless signals 116 that are transmitted by radio 114-2. Alternatively, radio 114-1 may transmit wireless signals 116 that are received by radio 114-2. However, as described further below with reference to FIG. 11, radio 114-1 consumes additional power when operating in a higher-power mode. If radio 114-1 remains in the higher-power mode even when it is not transmitting or receiving packets, the power consumption of electronic device 110-1 may be needlessly increased. Consequently, electronic devices 110 may include wake-up radios 118 that listen for and/or receive WUR frames or packets (and/or other wake-up communications, such as a WUR discovery frame) from access point 112 and then, when particular electronic devices are specified in the WUR frames, wake-up radios 118 selectively wake up radios 114, i.e., provide wake-up signals that selectively transition radios 114 from a lower-power mode to the higher-power mode.

During operation, access point 112 (such as radio 114-2) may select a recipient electronic device (such as electronic device 110-1). For example, electronic device 110-1 may be selected based at least in part on pending traffic for electronic device 110-1, such as pending down-link traffic in access point 112 for electronic device 110-1. Then, as described further below with reference to FIG. 2, radio 114-2 may provide a WUR discovery frame for electronic device 110-1. This WUR discovery frame may include information that specifies electronic device 110-1, such as an identifier of electronic device 110-1 (e.g., a media access control or MAC address).

After receiving the WUR discovery frame, WUR 118-1 may analyze the WUR discovery frame to determine if the information specifies electronic device 110-1. When the information specifies electronic device 110-1, WUR 118-1 may provide, to radio 114-1 (which may be a PCR), a wake-up signal that transitions radio 114-1 from the lower-power mode to the higher-power mode. Alternatively, when the information does not specify electronic device 110-1, WUR 118-1 may take no further action, e.g., radio 114-1 may remaining in the lower-power mode.

Moreover, the WUR discovery frame may include additional information. For example, as described further below with reference to FIGS. 3 and 4, the WUR discovery frame may include an identifier of a WLAN that includes access point 112 (such as a service set identifier or SSID) and a channel associated with the WLAN. After transitioning to the higher-power mode, radio 114-1 may determine whether the identifier is included in a list of known identifiers stored in electronic device 110-1. When the identifier is not included in the list, radio 114-1 may perform, based at least in part on the identifier and the channel, additional discovery associated with access point 112 without performing a full scan.

Alternatively or additionally, the WUR discovery frame may include an identifier of an operating class of the WLAN that includes access point 112, where the operating class specifies a regulatory domain and a channel set of the WLAN. After transitioning to the higher-power mode, radio 114-1 may perform additional discovery associated with access point 112, where the additional discovery includes a scan for at least a channel associated with the WLAN based at least in part on the channel set. For example, the scan may be for a channel or at least a subset of available channels in the channel set.

In some embodiments, the WUR discovery frame includes an identifier of the operating class of the WLAN that includes access point 112 and an index of a channel in a channel set of the WLAN, where the operating class specifies the regulatory domain and the channel set of the WLAN. After transitioning to the higher-power mode, radio 114-1 may perform additional discovery associated with access point 112 based at least in part on the channel.

Thus the additional information included in the WUR discovery frame may facilitate a smart or an intelligent scan that does not involve a full scan of all possible or available channels in one or more bands of frequencies.

Moreover, separately or in addition to other embodiments of the communication technique, in some embodiments the WUR discovery frame may facilitate a roaming decision. Notably, as described further below with reference to FIGS. 5 and 6, the WUR discovery frame may include an identifier of a WLAN associated with access point 112 (such as the SSID) and that electronic device 110-1 previously joined. Based at least in part on the identifier, electronic device 110-1 may make the roaming decision.

Furthermore, separately or in addition to other embodiments of the communication technique, in some embodiments the WUR discovery frame may facilitate a location service. Notably, as described further below with reference to FIGS. 7 and 8, the WUR discovery frame may include a transmit identifier or TXID (such as a basic service set identifier or BSSID, a partial BSSID or a compressed BSSID) associated with access point 112. Then, WUR 118-1 may determine a received signal strength associated with electronic device 110-1 based at least in part on wireless signals corresponding to the WUR discovery frame. Moreover, WUR 118-1 may provide the TXID and the received signal strength to a component in electronic device 110-1 that is associated with the location service.

Additionally, separately or in addition to other embodiments of the communication technique, in some embodiments the WUR discovery frame may have a variable length. For example, radio 114-2 may dynamically define the WUR discovery frame as the wireless environment changes. (However, in some embodiments, the WUR discovery frame may be static, e.g., the WUR discovery frame may be defined once by radio 114-2.)

Notably, as described further below with reference to FIGS. 9 and 10, the WUR discovery frame may include a compressed or a partial identifier associated with access point 112 or the WLAN that includes access point 112 (such as a compressed or partial SSID). In some embodiments, the compressed or partial identifier is included in a payload field.

For example, the identifier may be compressed using a hash function. Alternatively or additionally, the identifier may be jointly compressed with additional information. Moreover, the WUR discovery frame may include a bitmap and the compressed or the partial identifier may be specified by at least a bit in the bitmap.

The amount of compression or reduction of the compressed or partial identifier may be based at least in part on a communication environment (such as the wireless environment) that includes the recipient electronic device. For example, the communication environment may include: a number of electronic devices 110, a number of access points, and/or a number of neighboring WLANs. Moreover, the communication environment may include an estimated identifier collision probability between the compressed or the partial identifier and an identifier of one of electronic devices 110, the access points or the WLANs.

In these ways, the communication technique may allow electronic devices 110 and access point 112 to communicate efficiently (such as with low latency and high throughput) while significantly reducing the power consumption associated with radios 114 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, the WUR discovery frame may include a WUR discovery frame for a group of recipient electronic devices. After providing such a group WUR discovery frame, radio 114-2 may provide a trigger frame for the group of recipient electronic devices. This trigger frame may be provided after a time delay (such as a time delay between, e.g., 10 and 300 ms), so that radio 114-1 has sufficient time to transition to the higher-power mode. Moreover, after radio 118-1 receives the WUR discovery frame and radio 114-1 transitions to the higher-power mode, radio 114-1 may provide a group acknowledgment to radio 114-2. For example, radio 114-1 may provide the acknowledgment during an assigned time slot and/or in an assigned channel in the group acknowledgment. However, in some embodiments the recipient electronic devices in the group may individually provide acknowledgments to radio 114-2. Thus, after radio 118-1 receives the WUR discovery frame and radio 114-1 transitions to the higher-power mode, radio 114-1 (and, more generally, the PCRs in the recipient electronic devices) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
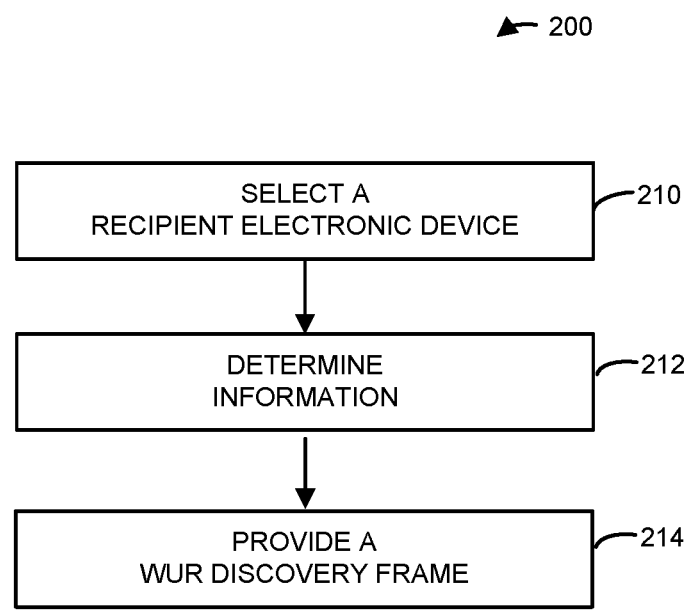
FIG. 2 is a flow diagram illustrating an example method for providing a wake-up-radio (WUR) discovery frame using one of the electronic devices in FIG. 1.

FIG. 2 presents a flow diagram illustrating an example method 200 for providing a WUR discovery frame in accordance with some embodiments. This method may be performed by an electronic device, such as an interface circuit in access point 112 in FIG. 1. During operation, the interface circuit may optionally select a recipient electronic device (operation 210). Then, the interface circuit may provide the WUR discovery frame (operation 214) for the recipient electronic devices.

Note that the WUR discovery frame may include: an identifier of the recipient electronic device; an identifier of a WLAN that includes the electronic device (such as a service set identifier or SSID); an identifier of the WLAN that includes the electronic device and a channel associated with the WLAN; an identifier of an operating class of the WLAN that includes the electronic device, where the operating class specifies a regulatory domain and a channel set of the WLAN; an identifier of an operating class of the WLAN that includes the electronic device and an index of a channel in the channel set of the WLAN, where the operating class specifies the regulatory domain and the channel set of the WLAN; a TXID (such as a BSSID, a partial BSSID or a compressed BSSID) associated with the electronic device; and/or a compressed or a partial identifier associated with the electronic device or the WLAN that includes the electronic device.

In some embodiments, the electronic device optionally determines information (operation 212) included in the WUR discovery frame based at least in part on a communication environment that includes the recipient electronic device. For example, an amount of compression or reduction of a compressed or partial identifier may be based at least in part on the communication environment that includes the recipient electronic device. Note that the communication environment may include: a number of electronic devices, and/or a number of neighboring WLANs. Furthermore, the communication environment may include an estimated identifier collision probability between the compressed or the partial identifier and an identifier of one of the electronic devices or the WLANs. Consequently, the WUR discovery frame may have a variable length, such as a length that is different from a length of another WUR discovery frame associated with the electronic device.

Figure 3:
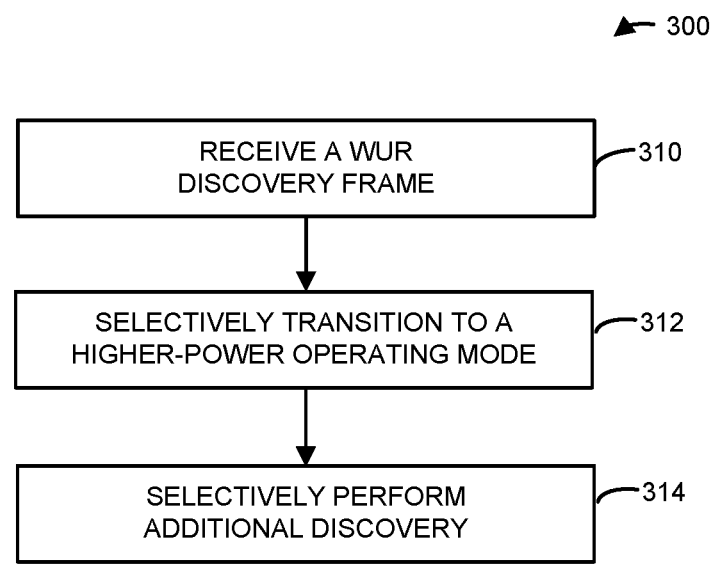
FIG. 3 is a flow diagram illustrating an example method for performing additional discovery using one of the electronic devices in FIG. 1.

FIG. 3 presents a flow diagram illustrating an example method 300 for performing additional discovery in accordance with some embodiments. This method may be performed by a recipient electronic device, such as an interface circuit in electronic device 110-1 in FIG. 1. This interface circuit may include a WUR and a PCR. During operation, the WUR may receive a WUR discovery frame (operation 310) associated with the electronic device, where the WUR discovery frame includes an identifier of a wireless local area network (WLAN) that includes the electronic device and a channel associated with the WLAN. For example, the electronic device may transmit the WUR discovery frame to the recipient electronic device. Moreover, the identifier may be or may include a SSID.

Then, the WUR may selectively transition the PCR from the lower-power mode to the higher-power mode (operation 312) in response to receiving the WUR discovery frame.

Moreover, the PCR may selectively perform additional discovery (operation 314) associated with the electronic device. For example, when the identifier is not included in a list of known identifiers stored in the recipient electronic device, the PCR may perform, based at least in part on the identifier and the channel, the additional discovery associated with the electronic device without performing a full scan. Alternatively or additionally, the WUR discovery frame may include an identifier of an operating class of a WLAN that includes the electronic device, where the operating class specifies a regulatory domain and a channel set of the WLAN. Moreover, the additional discovery may include a scan for at least a channel associated with the WLAN based at least in part on the channel set. In some embodiments, the WUR discovery frame includes an identifier of the operating class of the WLAN that includes the electronic device and an index of a channel in a channel set of the WLAN, where the operating class specifies the regulatory domain and the channel set of the WLAN. Furthermore, the additional discovery associated with the electronic device is based at least in part on the channel. Notably, the PCR may perform a scan for the channel.

Figure 4:
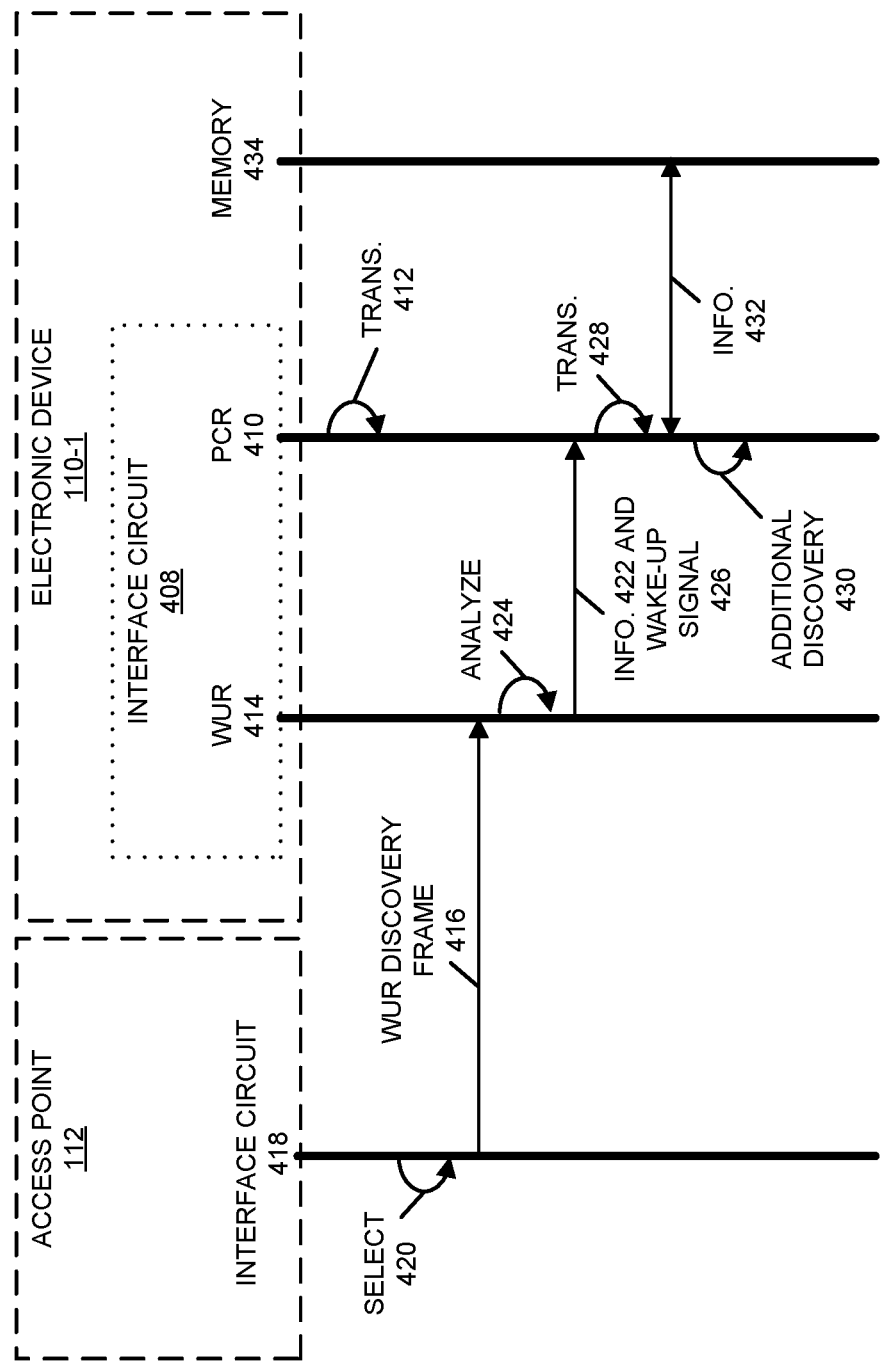
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112 in accordance with some embodiments. Notably, after associating with access point 112, PCR 410 in interface circuit 408 may transition 412 to the lower-power mode. While PCR 410 is in the lower-power mode, WUR 414 in interface circuit 408 may monitor or listen for a WUR discovery frame 416 (and/or other wake-up communication) from access point 112 that specifies electronic device 110-1.

Subsequently, when interface circuit 418 receives downlink traffic for electronic device 110-1, interface circuit 418 may select 420 electronic device 110-1. Then, interface circuit 418 may provide a WUR discovery frame 416 for electronic device 110-1 with information 422 (such as the identifier) that specifies that electronic device 110-1 is to transition from the lower-power mode to the higher-power mode.

After receiving WUR discovery frame 416, WUR 414 may analyze 424 the information 422 to determine if it specifies electronic device 110-1. When the information 422 specifies electronic device 110-1, WUR 414 may provide, to PCR 410, a wake-up signal 426 that transitions 428 PCR 410 from the lower-power mode back to the higher-power mode. In addition, WUR 414 may provide at least some of the information 422 to PCR 410. Alternatively, when the information 422 does not specify electronic device 110-1, WUR 414 may take no further action.

After transitioning 428 to the higher-power mode, PCR 410 may selectively perform additional discovery 430 associated with access point 112 (such as at least a partial scan) based at least in part on the information 422. In some embodiments, PCR 410 access additional information 432 in memory 434 in electronic device 110-1. For example, when the identifier is not included in a list of known identifiers stored in memory 434 in electronic device 110-1, PCR 410 may perform, based at least in part on the identifier and a channel specified in the information 422 and associated with the WLAN, a partial scan associated with access point 112 without performing a full scan. Alternatively or additionally, the information 422 may include an identifier of an operating class of a WLAN that includes access point 112, where the operating class (such as in conjunction with the additional information 432) specifies a regulatory domain and a channel set of the WLAN. In these embodiments, the additional discovery 430 may include a scan for the channel associated with the WLAN based at least in part on the channel set. In some embodiments, the information 422 includes an identifier of the operating class of the WLAN that includes access point 112 and an index of the channel in the channel set of the WLAN, where the operating class specifies the regulatory domain and the channel set of the WLAN. In these embodiments, the additional discovery 430 includes a scan for the channel without performing a full scan. Thus, the information 422 may, directly or indirectly, specify the channel, which allows PCR 410 to effectively perform a smart scan.

While the preceding discussion illustrated the communication technique with the PCR performing the additional discovery, in other embodiments the additional discovery is performed by the WUR without needing to wake up the PCR.

Figure 5:
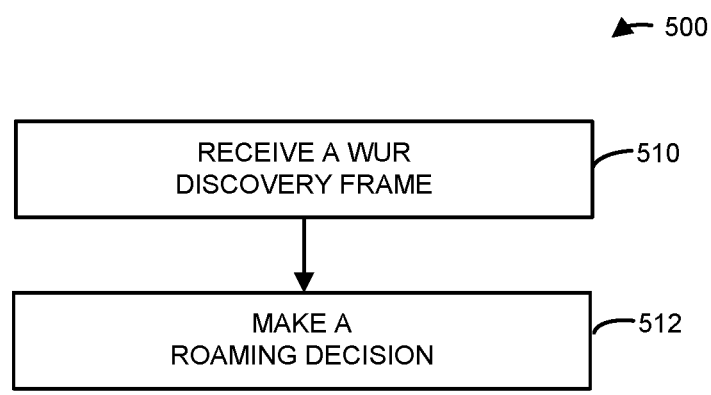
FIG. 5 is a flow diagram illustrating an example method for making a roaming decision using one of the electronic devices in FIG. 1.

FIG. 5 presents a flow diagram illustrating an example of a method 500 for making a roaming decision in accordance with some embodiments. This method may be performed by a recipient electronic device, such as an interface circuit in electronic device 110-1 in FIG. 1. This interface circuit may include a WUR and a PCR. During operation, the WUR may receive a WUR discovery frame (operation 510) associated with the electronic device, where the WUR discovery frame includes an identifier of a WLAN associated with the electronic device (such as an SSID) and that the recipient electronic device previously joined. Moreover, the recipient electronic device may make a roaming decision (operation 512) based at least in part on the identifier. For example, the WUR make selectively transition the PCR to the higher-power mode based at least in part on the identifier, and then the PCR may make the roaming decision.

Figure 6:
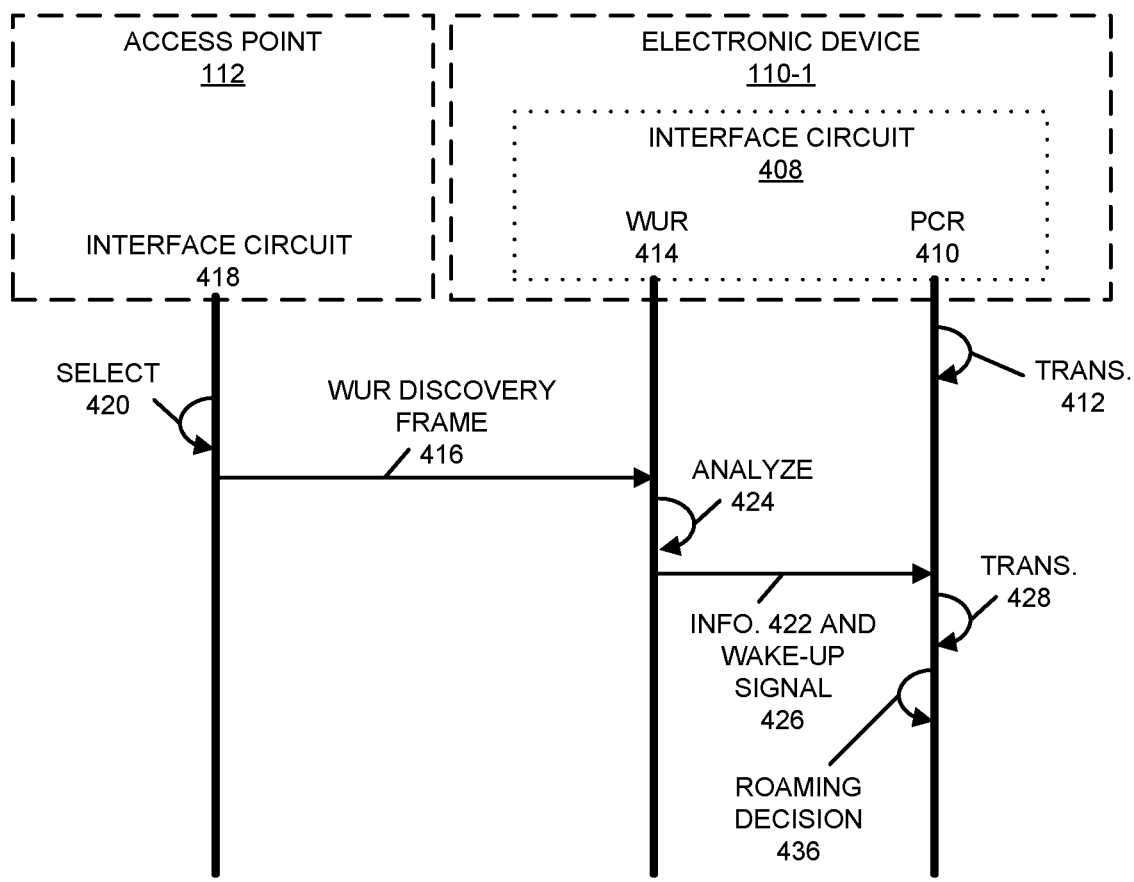
FIG. 6 is a flow diagram illustrating an example of communication between electronic devices, such as the electronic devices of FIG. 1.

FIG. 6 presents a flow diagram illustrating an example of communication between electronic device 110-1 and access point 112 in accordance with some embodiments. Notably, after associating with access point 112, PCR 410 may transition 412 to the lower-power mode. While PCR 410 is in the lower-power mode, WUR 414 may monitor or listen for a WUR discovery frame 416 (and/or other wake-up communication) from access point 112 that specifies electronic device 110-1.

Subsequently, when interface circuit 418 receives downlink traffic for electronic device 110-1, interface circuit 418 may select 420 electronic device 110-1. Then, interface circuit 418 may provide a WUR discovery frame 416 for electronic device 110-1 with information 422 (such as an identifier) that specifies that electronic device 110-1 is to transition from the lower-power mode to the higher-power mode.

After receiving WUR discovery frame 416, WUR 414 may analyze 424 the information 422 to determine if it specifies electronic device 110-1. When the information 422 specifies electronic device 110-1, WUR 414 may provide, to PCR 410, a wake-up signal 426 that transitions 428 PCR 410 from the lower-power mode back to the higher-power mode. In addition, WUR 414 may provide at least some of the information 422 to PCR 410. Alternatively, when the information 422 does not specify electronic device 110-1, WUR 414 may take no further action.

After transitioning 428 to the higher-power mode, PCR 410 may make a roaming decision 436 based at least in part on the information 422. For example, PCR 410 may determine whether to perform a BSS transition, such as to associate with another WLAN.

While the preceding discussion illustrated the communication technique with the PCR performing the roaming decision, in other embodiments the roaming decision is performed by the WUR without needing to wake up the PCR.

Figure 7:
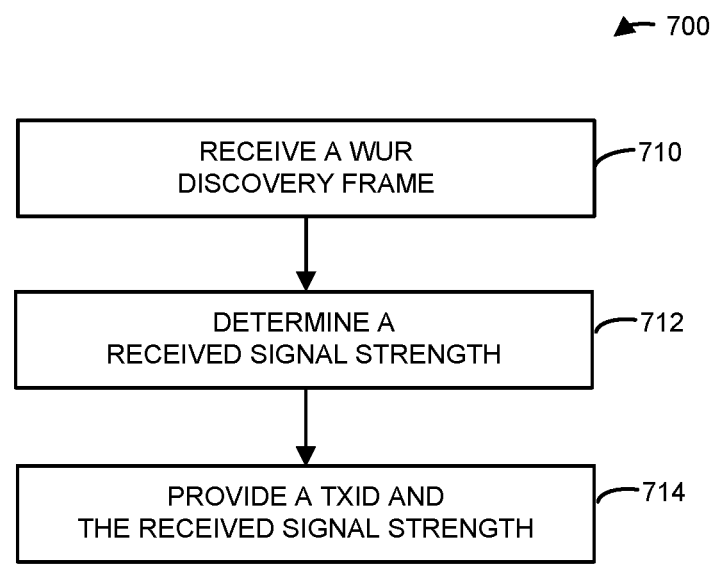
FIG. 7 is a flow diagram illustrating an example method for providing a transmit identifier (TXID) and a received signal strength using one of the electronic devices in FIG. 1.

FIG. 7 presents a flow diagram illustrating an example of a method 700 for providing a TXID and a received signal strength in accordance with some embodiments. This method may be performed by a recipient electronic device, such as an interface circuit in electronic device 110-1 in FIG. 1. This interface circuit may include a WUR and a PCR. During operation, the WUR may receive a WUR discovery frame (operation 710) associated with the electronic device, where the WUR discovery frame includes the TXID associated with the electronic device, such as a BSSID. Then, the WUR may determine the received signal strength (operation 712) associated with the electronic device based at least in part on wireless signals corresponding to the WUR discovery frame. Moreover, the WUR may provide the TXID and the received signal strength (operation 714) to a component in the recipient electronic device that is associated with a location service.

Figure 8:
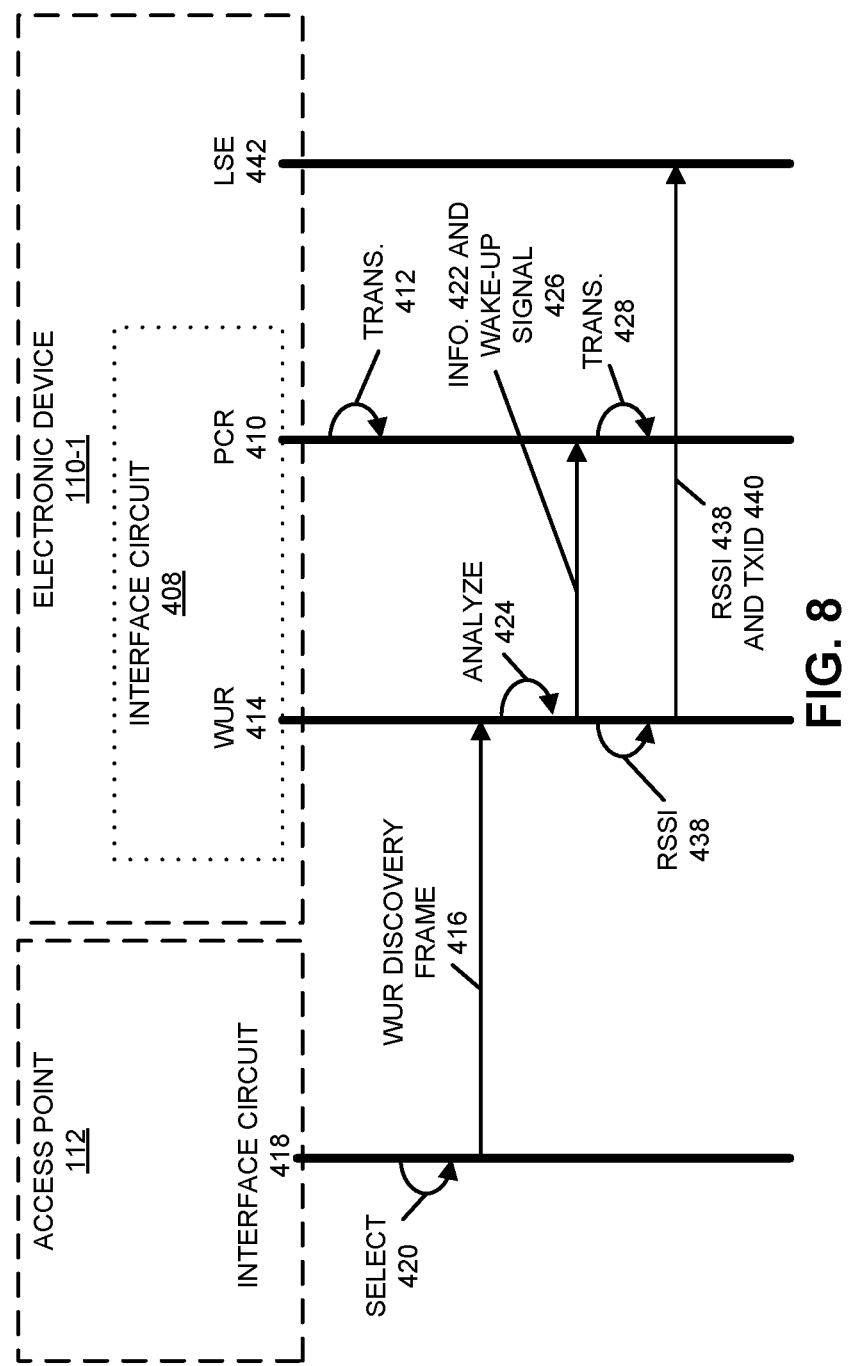
FIG. 8 is a flow diagram illustrating an example of communication between electronic devices, such as the electronic devices of FIG. 1.

FIG. 8 presents a flow diagram illustrating an example of communication between electronic device 110-1 and access point 112 in accordance with some embodiments. Notably, after associating with access point 112, PCR 410 may transition 412 to the lower-power mode. While PCR 410 is in the lower-power mode, WUR 414 may monitor or listen for a WUR discovery frame 416 (and/or other wake-up communication) from access point 112 that specifies electronic device 110-1.

Subsequently, when interface circuit 418 receives downlink traffic for electronic device 110-1, interface circuit 418 may select 420 electronic device 110-1. Then, interface circuit 418 may provide a WUR discovery frame 416 for electronic device 110-1 with information 422 (such as an identifier) that specifies that electronic device 110-1 is to transition from the lower-power mode to the higher-power mode.

After receiving WUR discovery frame 416, WUR 414 may analyze 424 the information 422 to determine if it specifies electronic device 110-1. When the information 422 specifies electronic device 110-1, WUR 414 may provide, to PCR 410, a wake-up signal 426 that transitions 428 PCR 410 from the lower-power mode back to the higher-power mode. In addition, WUR 414 may provide at least some of the information 422 to PCR 410. Alternatively, when the information 422 does not specify electronic device 110-1, WUR 414 may take no further action in waking up PCR 410.

Concurrently or separately, WUR 414 may determine the received signal strength (such as a received signal strength indicator or an RSSI 438) of the wireless signals associated with WUR discovery frame 416. Then, WUR 414 may provide RSSI 438 and a TXID 440 associated with access point 112 (which may be included in the information 422) to a location service engine 442 (LSE), such as software and/or hardware that is associated with a location service. For example, location service engine 442 may subsequently provide an instance of the location service (such as determining the location of electronic device 110-1) based at least in part on RSSI 438 and TXID 440.

While the preceding discussion illustrated the use of WUR discovery frame 416 to wake up PCR 410 and to provide information that can be used in the location service, in some embodiments WUR discovery 416 may be used to provide information that can be used in the location service without instructing WUR 414 to wake up PCR 410.

Figure 9:
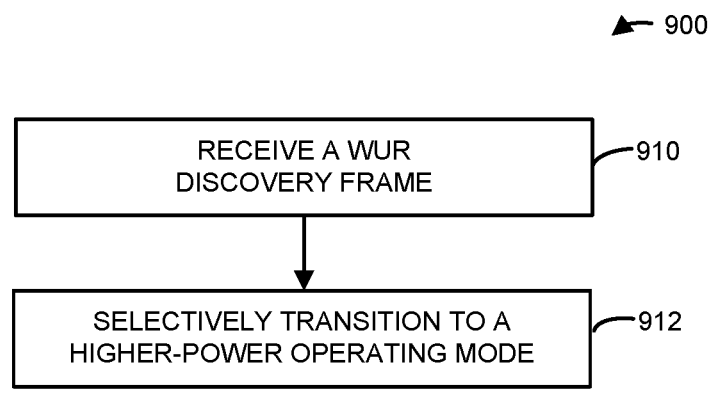
FIG. 9 is a flow diagram illustrating an example method for receiving a WUR discovery frame using one of the electronic devices in FIG. 1.

FIG. 9 presents a flow diagram illustrating an example of a method 900 for receiving a WUR discovery frame in accordance with some embodiments. This method may be performed by a recipient electronic device, such as an interface circuit in electronic device 110-1 in FIG. 1. This interface circuit may include a WUR and a PCR. During operation, the WUR may receive a WUR discovery frame (operation 910) associated with the electronic device, where the WUR discovery frame includes a compressed or a partial identifier associated with the electronic device or a WLAN that includes the electronic device. For example, the compressed or partial identifier may be included in a payload field in the WUR discovery frame. Note that the identifier may be or may include a compressed or partial SSID.

In some embodiments, the identifier is compressed using a hash function. Alternatively or additionally, the identifier may be jointly compressed with additional information. Moreover, the WUR discovery frame may include a bitmap and the compressed or the partial identifier may be specified by at least a bit in the bitmap.

Additionally, an amount of compression or reduction of the compressed or partial identifier may be based at least in part on a communication environment that includes the recipient electronic device.

Moreover, the WUR may selectively transition the PCR from a lower-power mode to a higher-power mode (operation 912) in response to receiving the WUR discovery frame. Note that the communication environment may include: a number of electronic devices, and/or a number of neighboring WLANs. Furthermore, the communication environment may include an estimated identifier collision probability between the compressed or the partial identifier and an identifier of one of the electronic devices or the WLANs. Consequently, the WUR discovery frame may have a variable length, such as a length that is different from a length of another WUR discovery frame associated with the electronic device.

In some embodiments of methods 200 (FIG. 2), 300 (FIG. 3), 500 (FIG. 5), 700 (FIG. 7) and/or 900, there may be additional or fewer operations. Moreover, the order of the operations may be changed, and/or two or more operations may be combined into a single operation or performed at least partially in parallel.

In some embodiments, at least some of the operations in methods 200 (FIG. 2), 300 (FIG. 3), 500 (FIG. 5), 700 (FIG. 7) and/or 900 are performed by an interface circuit in the electronic device or the recipient electronic device. For example, at least some of the operations may be performed by firmware executed by an interface circuit, such as firmware associated with a MAC layer, as well as one or more circuits in a physical layer in the interface circuit.

Figure 10:
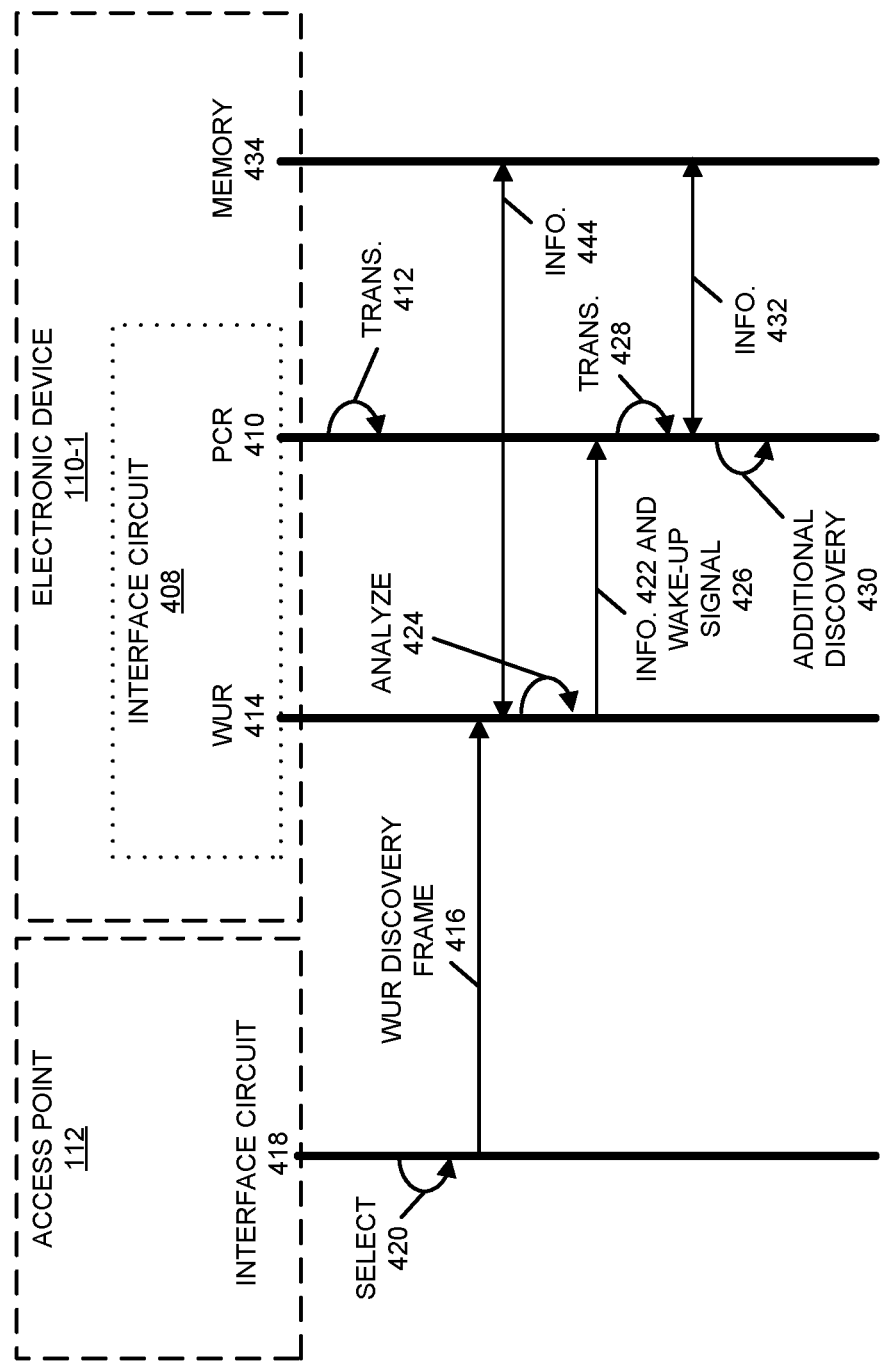
FIG. 10 is a flow diagram illustrating an example of communication between electronic devices, such as the electronic devices of FIG. 1.

FIG. 10 presents a flow diagram illustrating an example of communication between electronic device 110-1 and access point 112 in accordance with some embodiments. Notably, after associating with access point 112, PCR 410 may transition 412 to the lower-power mode. While PCR 410 is in the lower-power mode, WUR 414 may monitor or listen for a WUR discovery frame 416 (and/or other wake-up communication) from access point 112 that specifies electronic device 110-1.

Subsequently, when interface circuit 418 receives downlink traffic for electronic device 110-1, interface circuit 418 may select 420 electronic device 110-1. Then, interface circuit 418 may provide a WUR discovery frame 416 for electronic device 110-1 with information 422 (such as an identifier) that specifies that electronic device 110-1 is to transition from the lower-power mode to the higher-power mode.

After receiving WUR discovery frame 416, WUR 414 may analyze 424 the information 422 to determine if it specifies electronic device 110-1. When the information 422 specifies electronic device 110-1, WUR 414 may provide, to PCR 410, a wake-up signal 426 that transitions 428 PCR 410 from the lower-power mode back to the higher-power mode. In addition, WUR 414 may provide at least some of the information 422 to PCR 410. Alternatively, when the information 422 does not specify electronic device 110-1, WUR 414 may take no further action.

Note that the identifier may be a compressed or partial SSID. For example, the identifier may be compressed using a hash function. Alternatively or additionally, the identifier may be specified by at least a bit in the bitmap. Consequently, when analyzing 424 the information 422, WUR 414 may optionally access information 444 stored in memory 434.

While communication between components in FIGS. 4, 6, 8 and 10 is illustrated with lines having single or double arrows, in other embodiments the communication between the components in a given operation may be unidirectional or bidirectional.

Representative Embodiments

Figure 11:
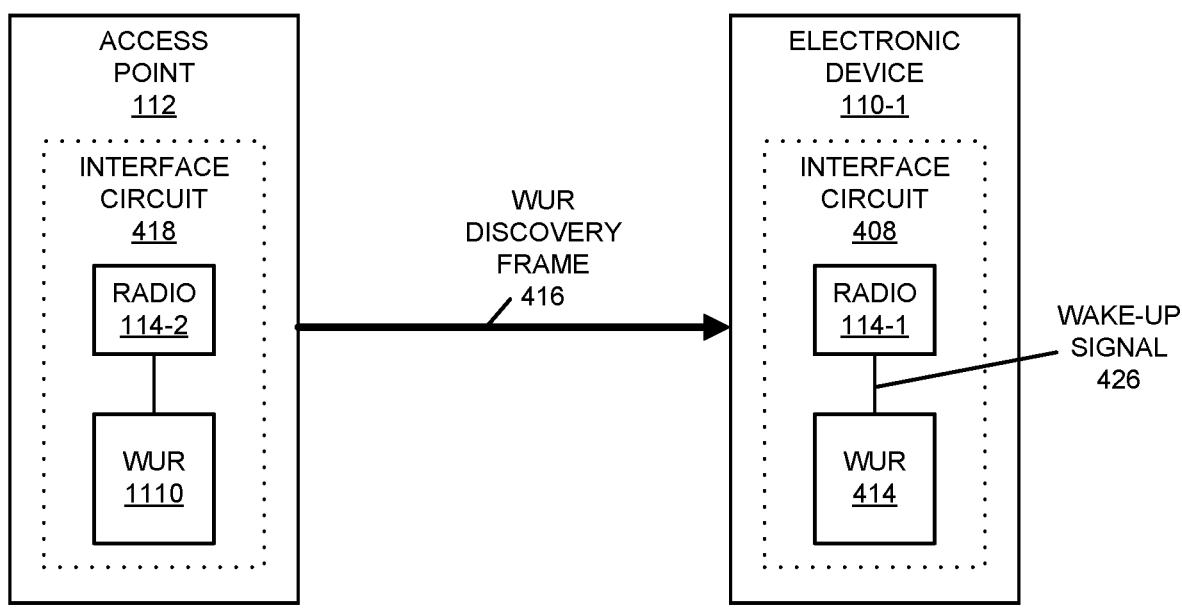
FIG. 11 is a drawing illustrating an example interface circuit in one of the electronic devices in FIG. 1.

In the communication technique, the WUR discovery frame may be used to selectively wake-up the PCR in the recipient electronic device. As shown in FIG. 11, which presents a drawing illustrating an example of an interface circuit 408 in electronic device 110-1 in accordance with some embodiments, in the communication technique a WUR 414 may be a companion radio to a main or principle connection (Wi-Fi) radio, such as radio 114-1, in interface circuit 408. WUR 414 may allow electronic device 110-1 to turn off radio 114-1, e.g., whenever possible. Moreover, WUR 414 may wake up radio 114-1 when WUR discovery frame 416 sent from optional WUR 1110 or radio 114-2 in access point 112 specifies electronic device 110-1. Note that in some embodiments WUR 414 is configured to receive wireless signals, while radio 114-1 is configured to transmit and to receive wireless signals. In these ways, the power consumption of WUR 414 may be very low, e.g., lower than Bluetooth Low Energy. WUR 414 can operate in an always-on mode and/or in a duty-cycle mode. For example, in the duty-cycle mode, WUR 414 may turn on or listen for a WUR discovery frame or a WUR frame from access point 112 based at least in part on a wake-up interval and/or a keep-alive interval of electronic device 110-1. Note that the keep-alive interval may specify the interval during which access point 112 sends at least one WUR discovery frame, such that electronic device 110-1 may expect to receive at least one WUR discovery frame from access point 112 within the keep-alive interval.

As discussed previously, a recipient electronic device sometimes scans through multiple channels for nearby access points, and/or may use measured wireless signal strengths for improved location services. However, scanning on a PCR consumes more power than a WUR. In addition, scanning on the PCR may conflict with regular data exchange, which may adversely impact communication performance.

Moreover, recipient electronic devices sometime scan for roaming purposes. For example, a roam scan may be triggered when the link quality degrades. However, a roam scan takes time because the roam scan is typically performed on multiple channels, and on each channel a recipient electronic device either conducts an active scan during which it sends a probe request and typically stays awake until it receives a probe response, or a passive scan during which it dwells on each channel for at least a beacon interval in order to receive a beacon. Therefore, scanning through multiple channels can introduce roaming latency and consumes power. In addition, a roam scan may also conflict with regular data exchange.

In order to address these problems, in the communication technique a WUR discovery frame, which is transmitted by another electronic device (such as an access point), may be used to enable a smart scanning procedure. For example, information included in the WUR discovery frame may be used to enhance or improve the scanning performance. Consequently, the described communication technique may improve the communication performance (such as reducing a scan time) and/or may reduce power consumption of a recipient electronic device.

For example, in some embodiments a WUR discovery frame may be used to enable an ultra-low-power location scan. Notably, in a WUR-facilitated location scan, a recipient electronic device may scan through the channels using a WUR receiver. Then, the WUR may use the signal strength measured from WUR packets received from one or more adjacent access points to provide additional information to the location services on the recipient electronic device. Stated differently, at least a portion of the location scan on the PCR may be offloaded to the WUR. Because a WUR consumes much less power than the PCR, a WUR-facilitated location scan may provide an ultra-low-power location-scan technique.

Moreover, in some embodiments a WUR discovery frame may be used to enable an ultra-low-power roam scan. For example, in a WUR-facilitated roam scan, a recipient electronic device may passively scan through multiple channels using a WUR. The WUR may collect basic information about one or more nearby access points. Then, the recipient electronic device may use the collected information to facilitate roaming decisions.

In addition, because of the low power operation, a WUR scan can be performed quite frequently in the background. Therefore, roaming information can be readily available whenever needed, which may reduce the roaming latency.

In some embodiments of the communication technique, a WUR discovery frame may be used during initial discovery. Currently, when a recipient electronic device leaves a Wi-Fi network or a WLAN, e.g., when a user leaves their office and heads for home, the PCR typically cannot be completely turned off because the recipient electronic device needs to use the PCR to perform active/passive scans to detect nearby Wi-Fi networks. For example, these scans may allow the PCR (e.g., a Wi-Fi radio) to establish communication when it is once again in range of a known access point.

Usually, these initial scans start from a preferred network list with known SSIDs (such as Wi-Fi network names), which may be stored in the recipient electronic device based at least in part on various criteria (such as recently joined Wi-Fi networks).

In order to save power, when a WUR is used, the PCR scan frequency may be reduced (e.g., to a much longer interval) because at least some of the Wi-Fi networks (e.g., those Wi-Fi networks that are WUR capable and/or non-hidden Wi-Fi networks) can be discovered by the WUR. Furthermore, because the WUR consumes much less power than the PCR, a WUR-facilitated roam scan may provide an ultra-low-power roam scan. Additionally, because of the low power operation, a WUR scan can be performed quite frequently in the background. Therefore, roaming information can be readily available whenever needed, which may reduce roaming latency.

During the initial discovery in the communication technique, SSID information is typically used as the first screening criterion. If an SSID in the preferred network list is found by a WUR, the recipient electronic device may determine that a preferred Wi-Fi network has been detected, and the PCR may be invoked (e.g., transitioned to a higher power-consumption mode) in order to discover more information about this preferred Wi-Fi network and to associate with it.

In this example, the primary channel information may be known or included in the stored preferred network list in the recipient electronic device. Therefore, the PCR may start from the stored channel during association and/or further discovery. For example, the PCR may use the stored channel to communicate and/or to associate with the preferred Wi-Fi network (such as an access point).

Alternatively, if an SSID is found that is not in the preferred network list, then, depending on policy, the recipient electronic device may invoke the PCR in order to perform further discovery. In this case, the primary channel information of the Wi-Fi network may be needed in order to avoid a full-band scan, which can take up to a few seconds or more.

Sometimes, after a recipient electronic device joins a Wi-Fi network, the recipient electronic device may engage in frequent activity, such as texting, web browsing etc. Consequently, the PCR typically is ON or in a higher power-consumption mode.

A PCR that is ON may also leverage various techniques for a smart-roam scan or a basic service set (BSS) transition. For example, the PCR may access or may obtain any/all of: a beacon report, an access-point report, a neighbor report, a reduced neighbor report, a fast initial link setup (FILS) discovery frame, etc. In some embodiments, the Wi-Fi Alliance may certify Multiband Operations (MBO) and Optimized Connectivity Experience (OCE) programs that allow an access point and a recipient electronic device to exchange this information to facilitate smart scanning and/or intelligent access-point selection/BSS transition.

Consequently, in order to support these embodiments, the SSID and the channel may be needed by the PCR. As described further below, this information may be included in a WUR discovery frame, so that the WUR can provide the information to the PCR.

However, during a continuous scan, a roaming decision can be very complicated and may depend on many parameters collected using a PCR. Often, a recipient electronic device may try to stay with the same operator or network provider, which usually has the same SSID. Consequently, the SSID may also be used with continuous scanning.

In summary, because information about the SSID and/or the channel number may be used for a roam scan in different scenarios, either or both may be included in a WUR discovery frame.

The information included in a WUR discovery frame may also be used during a location scan. During a location scan an identifier of an access point and the corresponding received signal strength (such as the RSSI) may be used.

Consequently, information specifying a TXID may be included in a WUR discovery frame. For example, the TXID may be a partial BSSID, a hashed BSSID value and/or access-point identifier information obtained from the PCR (or other information). In some embodiments, an access point may send its TXID using a PCR, and a recipient electronic device may store this information so that it can map to the corresponding full BSSID. Note that the TXID may have a fixed length or a variable length. In some embodiments where the TXID has a variable length, a length indication may be included, such as in a WUR discovery frame or in another frame or packet provided by the access point.

Figure 12:
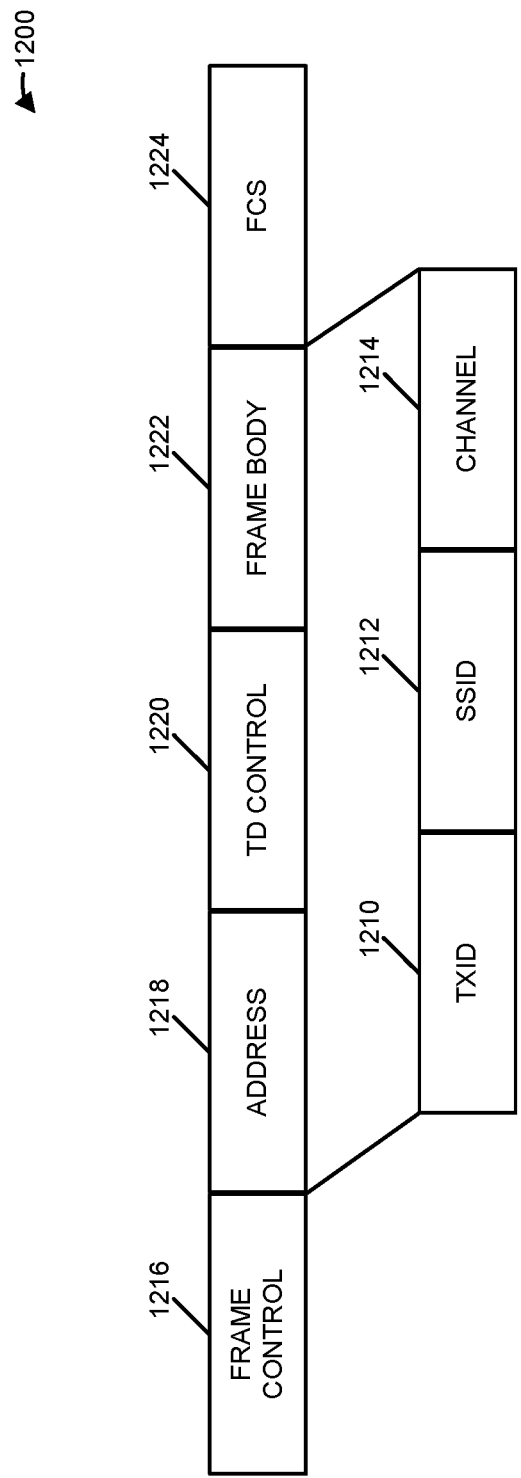
FIG. 12 is a drawing illustrating an example of a WUR discovery frame.

This is shown FIG. 12, which presents a drawing illustrating an example of a WUR discovery frame 1200 in accordance with some embodiments. WUR discovery frame 1200 may include fixed and/or variable information. Notably, for a roam scan, WUR discovery frame 1200 may optionally include information that specifies an SSID 1212 and/or a channel number 1214. Alternatively, for a location scan, WUR discovery frame 1200 may optionally include information that specifies a TXID 1210, such as a BSSID. In some embodiments, other information may be included that can be used for further enhancement or optimization. For example, WUR discovery frame 1200 may include any/all of: an eight-bit frame control 1216, a 12-bit address 1218 and a 12-bit TD control 1220 (as shown in FIG. 12, both of these may be used to specify: a 24-bit TXID 1210, a less-than-32-byte SSID 1212, and/or a 16-bit channel number 1214), an optional frame body 1222, and/or a frame check sequence (FCS) 1224.

In other embodiments, the order of items in WUR discovery frame 1200 can vary and additional and/or different items can be included. Moreover, other sizes or numerical formats and/or data can be used.

In the absence of compression, a total size of WUR discovery frame 1200 may be 14 octets (assuming a 32-bit FCS 1224). However, depending on the data rate, this may result in a long duration. For example, with a relatively higher data rate of, e.g., 250 kbps, the duration is 0.448 ms. With a relatively lower data rate of, e.g., 62.5 kbps, the duration increases to 1.79 ms.

Moreover, the 62.5 kbps data rate may enable communication over longer distances. However, the duration of WUR discovery frame 1200 may be too long. Consequently, at least for some data rates, at least a portion of WUR discovery frame 1200 may be compressed, such as the SSID 1212 and/or the channel number 1214 in the channel-information field. Alternatively, in some embodiments it may be mandated that WUR discovery frame 1200 is only transmitted using a relatively higher data rate, such as a data rate of 250 kbps.

A variety of different options for compressing the scanning information in WUR discovery frame 1200 may be used. For example, when compressing at least some of the information carried or conveyed in a WUR discovery frame, an independent field may be compressed independently. Thus, TXID 1210 (such as a partial BSSID), SSID 1212, and/or channel field 1214 may be compressed into up to three different fields. Alternatively, joint compression may be used, e.g., different fields may be compressed into a single field.

In general, there may be different combinations of different fields when compressing the information in WUR discovery frame 1200. For example, the SSID and the channel fields may be compressed into one value using a function (such as a hash function), and a BSS load and access-point capabilities may be compressed into another field.

In some embodiments, when hashing an SSID, the 32-octet full SSID may be compressed into a smaller number of octets using a partial SSID and/or a hash function. Alternatively, a four-octet short SSID (which is defined in IEEE 802.11) may be compressed into a smaller number of octets (such as two octets) using a partial short SSID and/or a hash function.

Figure 13:
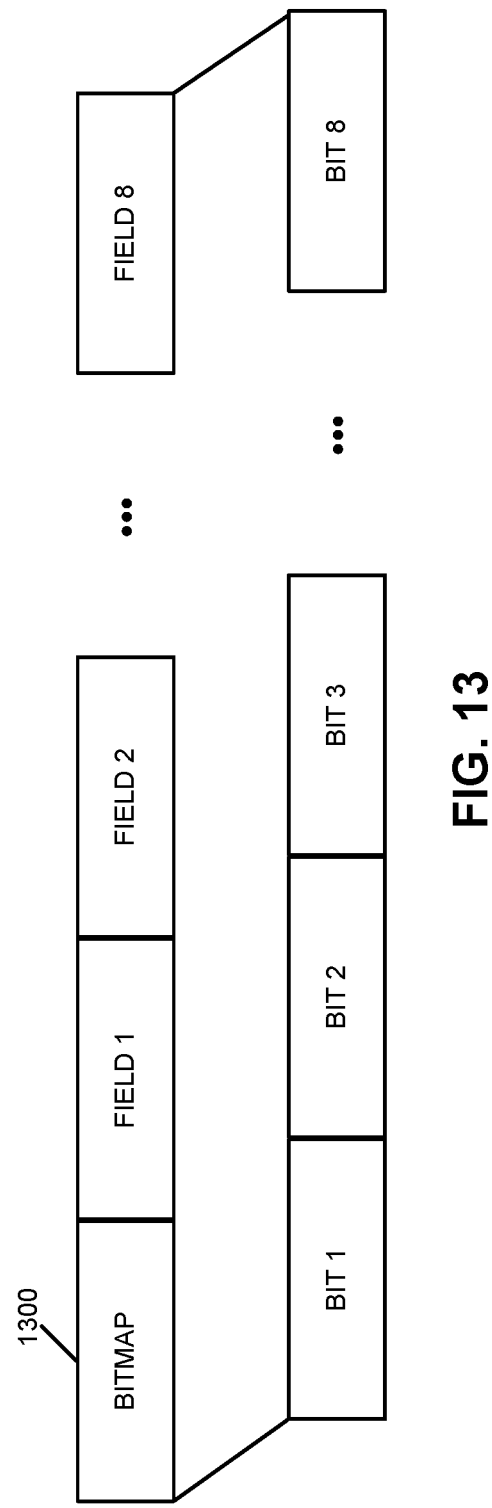
FIG. 13 is a drawing illustrating an example of a bitmap that can be included in a WUR discovery frame.

In order to indicate hashed information in a WUR discovery frame, a bitmap may be defined. This is shown in FIG. 13, which presents a drawing illustrating an example of a bitmap 1300 that can be included in a WUR discovery frame in accordance with some embodiments. The different bits in bitmap 1300 may be used to indicate the presence or absence of particular information, combinations of information and/or compressed information. For example, bit one may indicate the presence of a compressed SSID value, bit two may indicate the presence of a channel number hashed value, bit three may indicate the presence of a compressed combination of the SSID and the channel value, etc. Notably, a '1' in bit one may indicate the presence of a compressed SSID value, while a '0' in bit one may indicate the absence of a compressed SSID value, etc.

In other embodiments, the order of items in bitmap 1300 can vary and additional and/or different items can be included. Moreover, in other embodiments, other mapping techniques can be used.

In summary, a WUR discovery frame may contain compressed independent information, such as a compressed SSID value. Hashing using a hash function may be performed on the original SSID field (32 bytes) or a short SSID field (e.g., 4 bytes). Moreover, the compressed information may be a portion of the original information, such as a partial BSSID or a BSSID that is compressed using a hash function or cyclic redundancy check (CRC) function. The hash function may be applied to the full original information, such as the 16-bit full channel information or partial original information, e.g., the last LSB of the 16-bit channel information. Moreover, the compressed information may be derived by applying multiple hash functions. Furthermore, a WUR discovery frame may contain compressed and/or concatenated combinations of multiple information, such as an SSID and a channel that are jointly compressed using one hash function or CRC value. Note that a WUR discovery frame may contain an indication of which compressed value is present and the indication may indicate the specific combination of information that is present.

In some embodiments of the communication technique, the WUR discovery frame can be used in smart scanning, e.g., in IEEE 802.11ba. In these embodiments, the WUR discovery frame format may include different types of information, such as a compressed SSID, information associated with the PCR channel and/or an access-point identifier. In the following discussion, embodiments of the WUR discovery frame format are discussed, including a number of bits allocated to the different types information. In some embodiments, the WUR discovery frame has a fix format, while in other embodiments the WUR discovery frame has a variable format.

Figure 14:
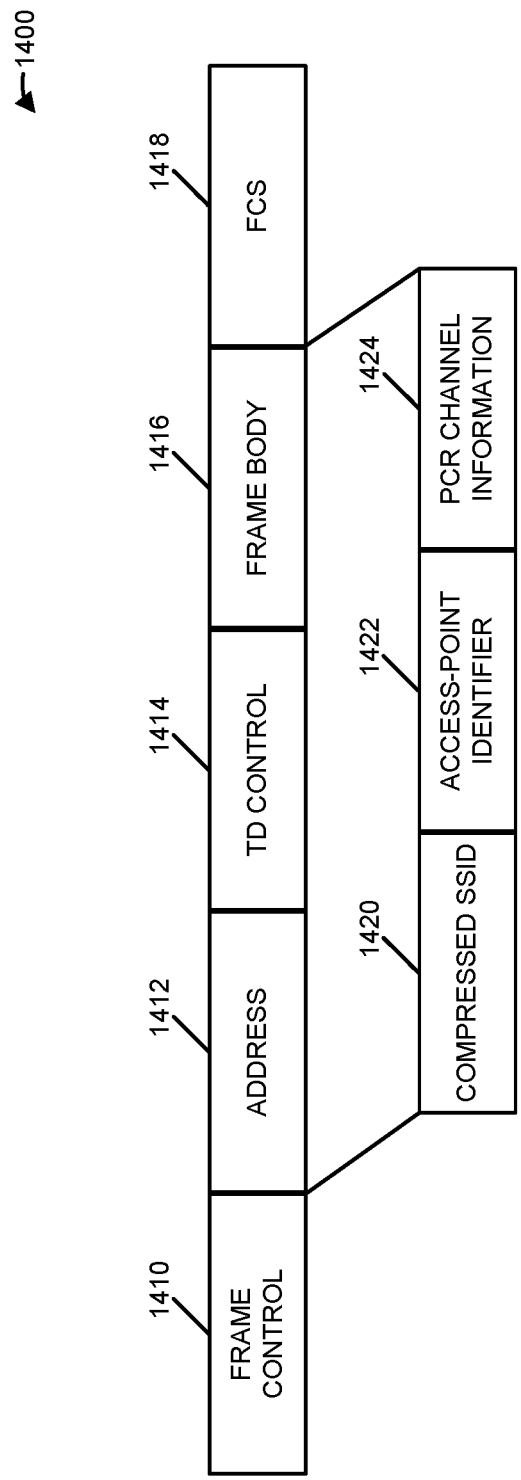
FIG. 14 is a drawing illustrating an example of a WUR discovery frame.

FIG. 14 presents a drawing illustrating an example of a WUR discovery frame 1400 in accordance with some embodiments. A format of WUR discovery frame 1400 may include any/all of: frame control 1410 (which may use eight bits), an address field 1412 (which may use 12 bits), a td control field 1414 (which may use 12 bits), an optional frame body 1416, and/or FCS 1418 (which may use two or three octets). Moreover, WUR discovery frame 1400 may optionally include information that specifies any/all of: a compressed SSID 1420, an access-point identifier 1422 and/or PCR channel information 1424 in address field 1412, the td control field 1414 and/or the optional frame body 1416.

However, the number of bits available for use in WUR discovery frame 1400 may be constrained by a variety of factors, such as a low data rate of 62.5 kbps and a total time for WUR discovery of 1.5 ms. Consequently, the size of WUR discovery frame 1400 may be less than 10 octets. Moreover, the compressed SSID 1420, the access-point identifier 1422 and/or the PCR channel information 1424 may not exceed 7 octets. For example, the compressed SSID 1420 may use two octets, the access-point identifier 1422 may use three octets and 1-2 octets may be used to specify the PCR channel information 1424.

In other embodiments, the order of items in WUR discovery frame 1400 can vary and additional and/or different items can be included.

Furthermore, the PCR channel may be defined or specified by an operation class and a channel number. Table 1 provides an example of operating classes. The operating class may indicate or specify the radio operation in a particular regulatory domain, as well as behaviors and signal-detection limits. The channel number may indicate or specify the channel index in a channel set. For example, as shown in Table 1, operating class '1' may indicate global operating class 115, with a channel starting frequency of 5 GHz and a channel spacing of 20 MHz.

Moreover, the channel set for global operating class 115 may include 36, 40, 44 and 48. Consequently, the channel number may specify on of these channels, such as channel 36.

TABLE 1

| Operating Class | Global Operating Class | Channel Starting Frequency (GHz) | Channel Spacing (MHz) | Channel Set | Channel Center Frequency Index | Behavior Limits Set |
|---|---|---|---|---|---|---|
| 1 | 115 | 5 | 20 | 36, 40, 44, 48 | — | — |
| 2 | 118 | 5 | 20 | 52, 56, 60, 64 | — | DFS 50-100 Behavior |
| 3 | 124 | 5 | 20 | 149, 153, 157, 161 | — | Nomadic Behavior |

TABLE 1-continued

| Operating Class | Global Operating Class | Channel Starting Frequency (GHz) | Channel Spacing (MHz) | Channel Set | Channel Center Frequency Index | Behavior Limits Set |
|---|---|---|---|---|---|---|
| 4 | 121 | 5 | 20 | 100, 104, 108, 112, 116, 120, 124, 128, 132, 136, 140, 144 | — | DFS 50-100 Behavior, Use EIRP for VHT Tx Power Env. |
| 5 | 125 | 5 | 20 | 149, 153, 157, 161, 165 | — | License Exempt Behavior |
| 6 | 103 | 4.9375 | 5 | 1, 2, 3, 4, 5, 6, 7, 8, 9, 10 | — | |
| 7 | 103 | 4.9375 | 5 | 1, 2, 3, 4, 5, 6, 7, 8, 9, 10 | — | |
| 8 | 103 | 4.9375 | 10 | 11, 13, 15, 17, 18 | — | |

Additionally, the operating class may determine the behavior of a recipient electronic device in the regulatory domain, such as the maximum transmit power. Therefore, after discovering an access point, a recipient electronic device may need to obtain the operating-class information prior to performing active scanning. Moreover, the operating-class information may reduce the number of channels that the recipient electronic device needs to search, which can reduce the power consumption and the search time. For example, as noted previously, operating class 115 may include four 20 MHz channels. Without the operating-class information, the recipient electronic device may need to search up to 256 possible operating class indexes. Consequently, in some embodiments the WUR discovery frame may include the operating-class information in the PCR channel information 1424.

In some embodiments, a few more bits (such as four bits) may be used to indicate or specify the possible channel index within the specified operating class. (Thus, in some embodiments, a WUR discovery frame may include the channel index, while in other embodiments a WUR discovery frame may not include this information.) For example, four bits (instead of eight bits) may be used to indicate up to 16 possible channels in the channel set for a specific operating class. Thus, for operating class 121 (which may be specified by an operating class index of '4'), there may be 12 channels in the channel set. Instead of specifying the specific channel in the channel set, the PCR channel information 1424 in WUR discovery frame 1400 may specify an index in the channel set, such as '4', which may indicate channel 112.

As noted previously, the operation of the recipient electronic device may be based at least in part on the PCR channel information 1424 in WUR discovery frame 1400. Notably, if WUR discovery frame 1400 only carries or includes the operating class, then the PCR in the recipient electronic device can search through the possible channel numbers defined under this operating class one by one. Alternatively, if WUR discovery frame 1400 also includes a channel index that indicates the specific channel number, then the PCR in the recipient electronic device can search only this specific channel index.

Moreover, the compressed SSID 1420 may be used to reduce the size of the SSID (32 octets) to a smaller size. For example, the compressed SSID 1420 may less than or equal to two octets, which may leave more bits for the access-point identifier 1422 in WUR discovery frame 1400. In some embodiments, a number of bits in the compressed SSID 1420 is based at least in part on a collision probability with other compressed SSIDs. For example, with two octets (16 bits), the collision probability may be: 0.00% with two WLANs, 0.01% with four WLANs, 0.05% with eight WLANs, 0.20% with 16 WLANs, 0.78% with 32 WLANs, and 3.13% with 64 WLANs. More generally, the compressed SSID 1420 may be smaller than or different from that used in IEEE 802.11ai and IEEE 802.11ah. Note that the compressed SSID 1420 in WUR discovery frame 1400 can be advertised by an access point in its broadcast frames. This may allow the recipient electronic device to store this value in its preferred network list, as well as other network information. In some embodiments, the compressed SSID 1420 includes a least-significant byte or a most-significant byte of the SSID. Alternatively or additionally, the compressed SSID 1420 may be determined using a hash function.

Furthermore, WUR Discovery frame 1400 may carry or include the access-point identifier 1422 that is compressed from the original full access-point identifier, such as a compressed version of the BSSID. For example, the resulting 20-24 bit access-point identifier may provide or result in a low access-point identity collision probability (the probability that two or more different access points compress their original identifiers such as BSSID into the same access-point identifier value) when there are up to 200 access points. Notably, with 200 access points, the collision probability may be less than 0.001, if the original access-point identifiers (such as BSSIDs) are evenly mapped to the compressed access-point identifiers which are carried or included in WUR Discovery frame 1400.

Figure 15:
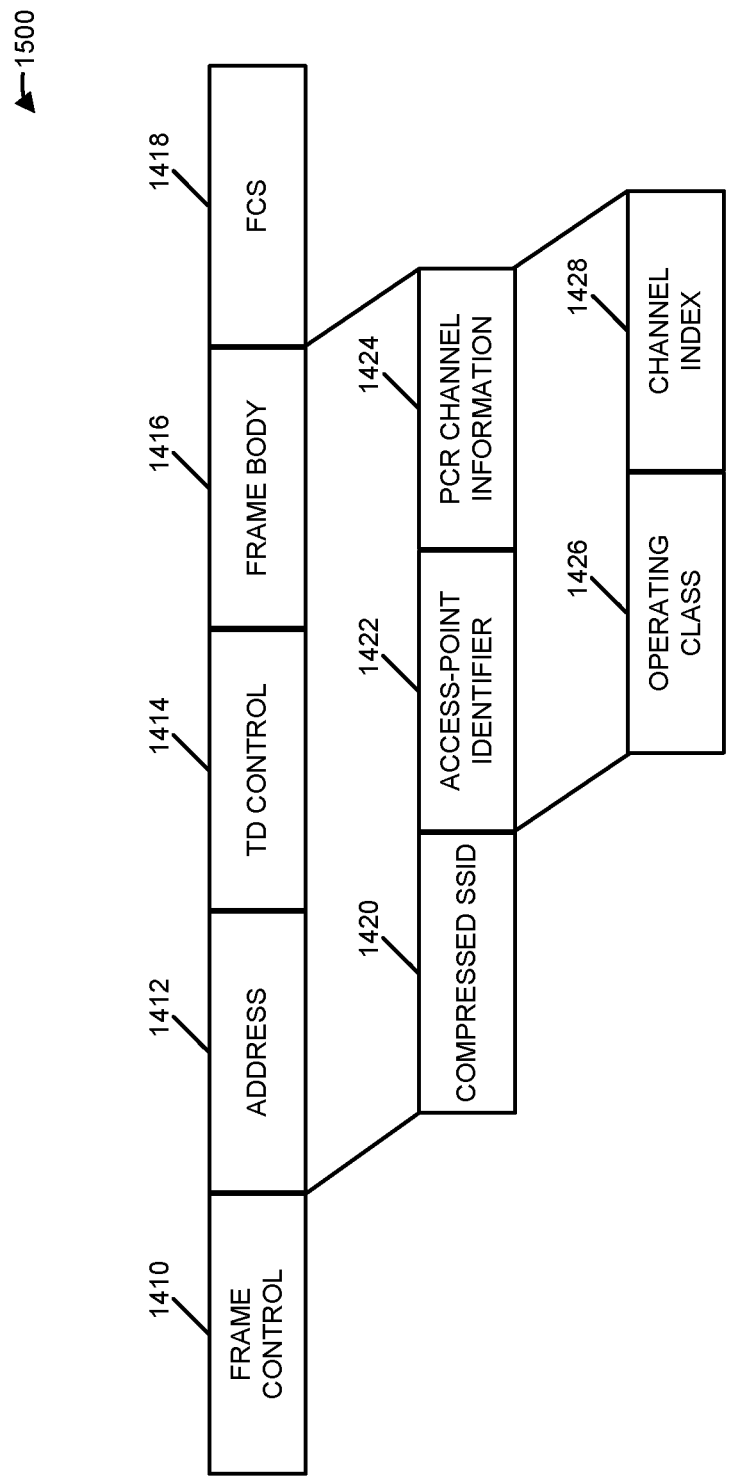
FIG. 15 is a drawing illustrating an example of a WUR discovery frame.

In some embodiments, the WUR discovery frame has a fixed format. This is shown in FIG. 15, which presents a drawing illustrating an example of a WUR discovery frame 1500 in accordance with some embodiments. Notably, the compressed SSID 1420 may use, e.g., less than or equal to 16 bits, the access-point identifier 1422 may use, e.g., 24 bits if FCS 1418 use two octets or, e.g., 20 bits if FCS 1418 uses three octets, and the PCR channel information 1424 may use, e.g., 8 bits if FCS 1418 uses three octets or, e.g., 12 bits if FCS 1418 uses two octets. Moreover, the PCR channel information 1424 may include the operating class 1426 using, e.g., eight bits, and/or the channel index 1428 under the specific operating class using, e.g., four bits.

In other embodiments, the order of items in WUR discovery frame 1500 can vary and additional and/or different items can be included.

However, as discussed previously, in some embodiments the WUR discovery frame has a variable size. This may be facilitated by an access point advertising a compressed SSID and/or a compressed (or reduced-size) access-point identifier, as well as their sizes.

Figure 16:
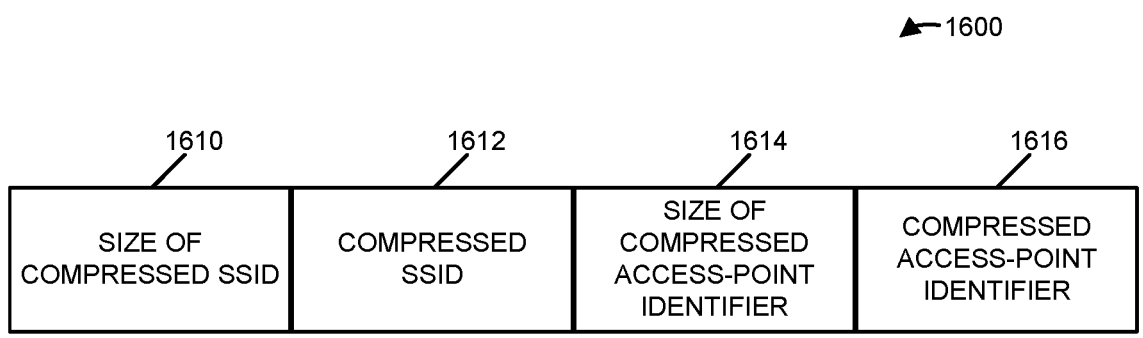
FIG. 16 is a drawing illustrating an example of an information element in a beacon.

This is shown in FIG. 16, which presents a drawing illustrating an example of an information element 1600 in a beacon in accordance with some embodiments. Notably, an access point may advertise any/all of a compressed SSID 1612 and/or a compressed access-point identifier 1616 and their sizes 1610 and 1614, e.g., in advertising frames. For example, an access point may evaluate how many neighbor SSIDs and neighbor access points are in an adjacent area based at least in part on received frames from those access points. Then, based at least in part on the evaluation, the access point may determine how many bits are needed for the compressing SSID 1612 and/or the compressed access-point identifier 1616 based at least in part on one or more criteria, such as a maximum collision probability given the current communication environment (e.g., a number of access points, a number of networks, etc.). Then, the access point may accordingly compress the SSID and/or the access-point identifier. For example, the compressed access-point identifier 1616 may be determined using a hash function, and may include, e.g., 20 bits instead of 48 bits. However, as noted previously, in general the compressed SSID 1612 and/or the compressed access-point identifier 1616 may use a variable number of bits based at least in part on the communication environment. In some embodiments, the access point may decide to use, e.g., ten bits for the compressed SSID 1612 and, e.g., 22 bits for the compressed access-point identifier 1616. As noted previously, the access point may advertise the compressed SSID 1612 and/or the compressed access-point Identifier 1616 and their sizes 1610 and 1614 in information element 1600 that is carried or included in broadcast frames, such as beacons. Alternatively or additionally, the access point may include the compressed SSID 1612 and/or the compressed access-point identifier 1616 that are to be included in a WUR Discovery frame and their sizes 1610 and 1614 in a probe response.

In other embodiments, the order of items in information element 1600 can vary and additional and/or different items can be included.

Moreover, the operation of a recipient electronic device may be based at least in part on the advertised information. Notably, a recipient electronic device that receives one of the broadcast frames may store the information and may add it to a preferred network list. Then, if the recipient electronic device encounters the same network or WLAN again, it can use the stored information to scan for this network. For example, the recipient electronic device may assume the sizes of the compressed SSID and/or the compressed access-point identifier in a WUR Discovery frame for this particular network based at least in part on the information it has previously received (and stored) from broadcast frames.

Referring back to FIG. 15, in some embodiments WUR discovery frame 1500 has a variable format. This variable format may include the compressed SSID 1420 using a number of bits based at least in part on the advertised information and an access-point identifier 1422 based at least in part on the advertised information. Moreover, the PCR channel information 1424 may use, e.g., 8 bits if FCS 1418 uses three octets or, e.g., 12 bits if FCS 1418 uses two octets. Note that the PCR channel information 1424 may include the operating class 1426 using, e.g., eight bits, and the channel index 1428 under the specific operating class may be optionally included using, e.g., four bits.

When an access point sends a WUR discovery frame to a recipient electronic device, the access point may need to receive acknowledgment from the recipient electronic device in order to know whether the recipient electronic device received the WUR discovery frame, and consequently whether the access point can send traffic to the recipient electronic device over the PCR. In general, any subsequent frames or packets sent by the recipient electronic device may serve as an acknowledgment. As noted previously, in order to reduce the contention of the multiple recipient electronic devices sending acknowledgments at the same time, the access point may use an IEEE 802.11ax trigger frame to solicit simultaneous acknowledgment. Note that the acknowledgments may be temporally distinct or they may occur concurrently, such as via OFDMA. If one of the recipient electronic devices in a group does not provide an acknowledgment, the access point may send a unicast message to this recipient electronic device. If an acknowledgment is still not received, the access point may resend a WUR discovery frame to the recipient electronic device.

In summary, the communication technique may allow a recipient electronic device to be selectively transitioned to the higher-power mode while consuming less bandwidth. Moreover, the communication technique may provide information that allows a recipient electronic device to perform smart scanning and/or roaming decisions. Consequently, the communication technique may improve the performance of the electronic device and/or the recipient electronic device. This improved performance may improve the quality of service and/or may increase the battery life of the recipient electronic device. Therefore, the communication technique may increase customer satisfaction when using the electronic device and/or the recipient electronic device.

We now describe embodiments of an electronic device. FIG. 17 presents a block diagram of an example of an electronic device 1700 (which may be a cellular telephone, an access point, another electronic device, etc.) in accordance with some embodiments. This electronic device includes any/all of: processing subsystem 1710, memory subsystem 1712, and/or networking subsystem 1714. Processing subsystem 1710 includes one or more devices configured to perform computational operations. For example, processing subsystem 1710 can include one or more microprocessors, application-specific integrated circuits (ASICs), graphics processing units (GPUs), microcontrollers, programmable-logic devices, and/or one or more digital signal processors (DSPs).

Memory subsystem 1712 includes one or more devices for storing data and/or instructions for processing subsystem 1710 and networking subsystem 1714. For example, memory subsystem 1712 can include dynamic random access memory (DRAM), static random access memory (SRAM), a read-only memory (ROM), flash memory, and/or other types of memory. In some embodiments, instructions for processing subsystem 1710 in memory subsystem 1712 include: program instructions or sets of instructions (such as program instructions 1722 or operating system 1724), which may be executed by processing subsystem 1710. For example, a ROM can store programs, utilities or processes to be executed in a non-volatile manner, and DRAM can provide volatile data storage, and may store instructions related to the operation of electronic device 1700. Note that the one or more computer programs may constitute a computer-program mechanism, a computer-readable storage medium or software. Moreover, instructions in the various modules in memory subsystem 1712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1710. In some embodiments, the one or more computer programs are distributed over a network-coupled computer system so that the one or more computer programs are stored and executed in a distributed manner.

In addition, memory subsystem 1712 can include mechanisms for controlling access to the memory. In some embodiments, memory subsystem 1712 includes a memory hierarchy that comprises one or more caches coupled to a memory in electronic device 1700. In some of these embodiments, one or more of the caches is located in processing subsystem 1710.

In some embodiments, memory subsystem 1712 is coupled to one or more high-capacity mass-storage devices (not shown). For example, memory subsystem 1712 can be coupled to a magnetic or optical drive, a solid-state drive, or another type of mass-storage device. In these embodiments, memory subsystem 1712 can be used by electronic device 1700 as fast-access storage for often-used data, while the mass-storage device is used to store less frequently used data.

Figure 17:
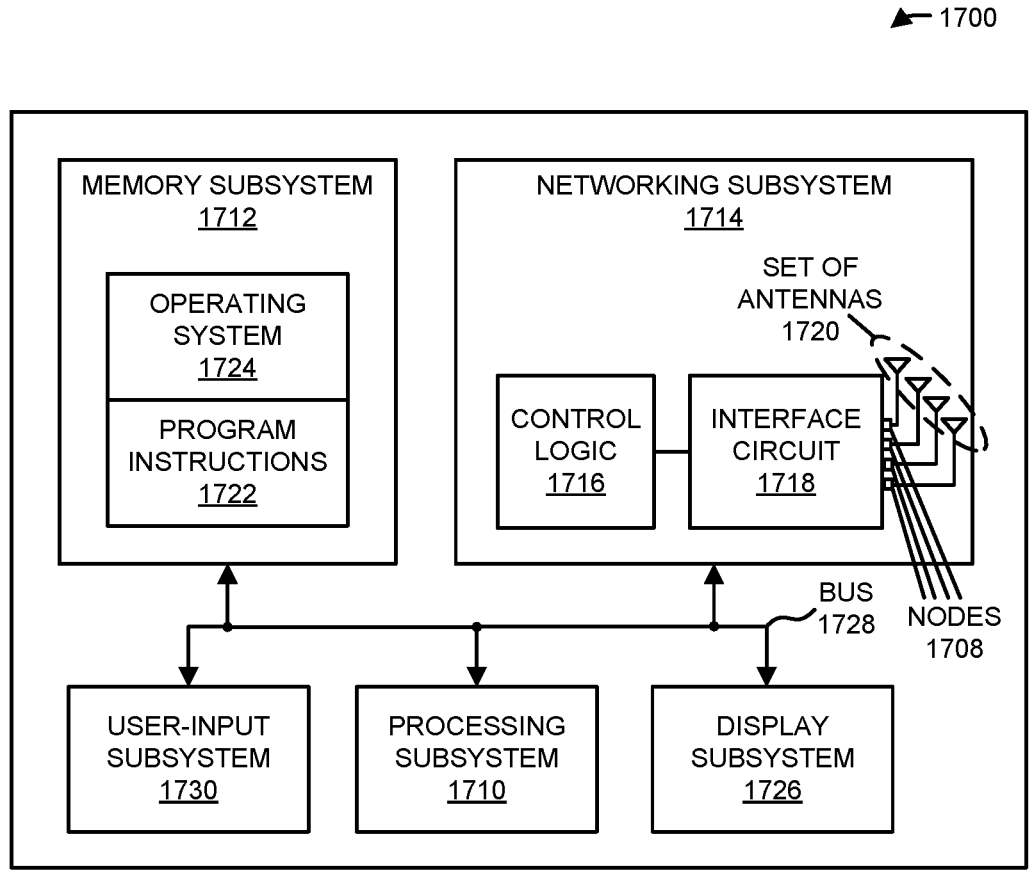
FIG. 17 is a block diagram illustrating an example of one of the electronic devices of FIG. 1.

Networking subsystem 1714 includes one or more devices configured to couple to and communicate on a wired and/or wireless network (i.e., to perform network operations), including: control logic 1716, an interface circuit 1718 and a set of antennas 1720 (or antenna elements) in an adaptive array that can be selectively turned on and/or off by control logic 1716 to create a variety of optional antenna patterns or 'beam patterns.' (While FIG. 17 includes set of antennas 1720, in some embodiments electronic device 1700 includes one or more nodes, such as nodes 1708, e.g., a pad, which can be coupled to set of antennas 1720. Thus, electronic device 1700 may or may not include set of antennas 1720.) For example, networking subsystem 1714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1714 includes one or more radios, such as a WUR that is used to receive one or more WUR discovery frames, and a PCR that is used to transmit and/or receive frames or packets during a higher-power mode. The WUR and the PCR may be implemented separately (such as using discrete components or separate integrated circuits) or in a common integrated circuit.

Networking subsystem 1714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1700 may use the mechanisms in networking subsystem 1714 for performing simple wireless communication between the electronic devices, e.g., transmitting advertising or beacon frames and/or scanning for advertising frames transmitted by other electronic devices.

Within electronic device 1700, processing subsystem 1710, memory subsystem 1712, and networking subsystem 1714 are coupled together using bus 1728 that facilitates data transfer between these components. Bus 1728 may include an electrical, optical, and/or electro-optical connection that the subsystems can use to communicate commands and data among one another. Although only one bus 1728 is shown for clarity, different embodiments can include a different number or configuration of electrical, optical, and/or electro-optical connections among the sub systems.

In some embodiments, electronic device 1700 includes a display subsystem 1726 for displaying information on a display, which may include a display driver and the display, such as a liquid-crystal display, a multi-touch touchscreen, etc. Display subsystem 1726 may be controlled by processing subsystem 1710 to display information to a user (e.g., information relating to incoming, outgoing, or an active communication session).

Electronic device 1700 can also include a user-input subsystem 1730 that allows a user of the electronic device 1700 to interact with electronic device 1700. For example, user-input subsystem 1730 can take a variety of forms, such as: a button, keypad, dial, touch screen, audio input interface, visual/image capture input interface, input in the form of sensor data, etc.

Electronic device 1700 can be (or can be included in) any electronic device with at least one network interface. For example, electronic device 1700 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1700, in alternative embodiments, different components and/or subsystems may be present in electronic device 1700. For example, electronic device 1700 may include one or more additional processing subsystems, memory subsystems, networking subsystems, and/or display subsystems. Additionally, one or more of the subsystems may not be present in electronic device 1700. Moreover, in some embodiments, electronic device 1700 may include one or more additional subsystems that are not shown in FIG. 17. Also, although separate subsystems are shown in FIG. 17, in some embodiments some or all of a given subsystem or component can be integrated into one or more of the other subsystems or component(s) in electronic device 1700. For example, in some embodiments program instructions 1722 are included in operating system 1724 and/or control logic 1716 is included in interface circuit 1718.

Moreover, the circuits and components in electronic device 1700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1714. This integrated circuit may include hardware and/or software mechanisms that are used for transmitting wireless signals from electronic device 1700 and receiving signals at electronic device 1700 from other electronic devices. Aside from the mechanisms herein described, radios are generally known in the art and hence are not described in detail. In general, networking subsystem 1714 and/or the integrated circuit can include any number of radios. Note that the radios in multiple-radio embodiments function in a similar way to the described single-radio embodiments.

In some embodiments, networking subsystem 1714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1722, operating system 1724 (such as a driver for interface circuit 1718) or in firmware in interface circuit 1718. Alternatively or additionally, at least some of the operations in the communication technique may be implemented in a physical layer, such as hardware in interface circuit 1718. In some embodiments, the communication technique is implemented, at least in part, in a MAC layer and/or in a physical layer in interface circuit 1718.

While examples of numerical values are provided in the preceding discussion, in other embodiments different numerical values are used. Consequently, the numerical values provided are not intended to be limiting.

While the preceding embodiments illustrated the use of a WUR discovery frame that is communicated using Wi-Fi, in other embodiments of the communication technique Bluetooth Low Energy is used to communicate the WUR discovery frame. Furthermore, the WUR discovery frame may be communicated in the same or a different band of frequencies that the band(s) of frequencies used by the PCR. For example, the WUR discovery frame may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A recipient electronic device, comprising:
a node configured to communicatively couple to an antenna; and
an interface circuit, communicatively coupled to the node, configured to communicate with an electronic device, wherein the interface circuit comprises a primary connectivity radio (PCR) and a wake-up radio (WUR);
wherein the WUR in the interface circuit is configured to:
receive, from the node, a wake-up-radio (WUR) discovery frame associated with the electronic device, wherein the WUR discovery frame comprises an identifier of an operating class of a wireless local area network (WLAN) that includes the electronic device, wherein the operating class uniquely specifies a regulatory domain and a channel set of the WLAN, and the channel set comprises multiple possible available channels in the regulatory domain;
selectively transition the PCR from a lower-power mode to a higher-power mode in response to receiving the WUR discovery frame; and
perform additional discovery associated with the electronic device, wherein the additional discovery comprises a scan for at least a channel associated with the WLAN based at least in part on the channel set.

2. The recipient electronic device of claim 1, wherein the electronic device comprises an access point.

3. The recipient electronic device of claim 1, wherein the WUR discovery frame is compatible with an IEEE 802.11 communication protocol.

4. The recipient electronic device of claim 1, wherein the scan involves a scan of channels in the channel set.

5. The recipient electronic device of claim 1, wherein the WUR discovery frame comprises an identifier of the WLAN, which the recipient electronic device previously joined; and
wherein the recipient electronic device makes a roaming decision based at least in part on the identifier.

6. The recipient electronic device of claim 1, wherein the WUR discovery frame comprises a compressed or a partial identifier associated with the electronic device or the WLAN.

7. The recipient electronic device of claim 1, wherein the WUR discovery frame has a different length than another WUR discovery frame associated with the electronic device.

8. A non-transitory computer-readable storage medium for use in conjunction with a recipient electronic device, the computer-readable storage medium storing program instructions that, when executed by the recipient electronic device, cause the recipient electronic device to carrying out one or more operations comprising:
receiving, by a wake-up radio (WUR) in an interface circuit in the recipient electronic device, a WUR discovery frame associated with an electronic device, wherein the WUR discovery frame comprises an identifier of an operating class of a wireless local area network (WLAN) that includes the electronic device, wherein the operating class uniquely specifies a regulatory domain and a channel set of the WLAN, and the channel set comprises multiple possible available channels in the regulatory domain;
selectively transitioning a primary connectivity radio (PCR) in the recipient electronic device from a lower-power mode to a higher-power mode in response to receiving the WUR discovery frame; and
performing additional discovery associated with the electronic device using the PCR, wherein the additional discovery comprises a scan for at least a channel associated with the WLAN based at least in part on the channel set.

9. The computer-readable storage medium of claim 8, wherein the electronic device comprises an access point.

10. The computer-readable storage medium of claim 8, wherein the WUR discovery frame is compatible with an IEEE 802.11 communication protocol.

11. The computer-readable storage medium of claim 8, wherein the scan involves a scan of channels in the channel set.

12. The computer-readable storage medium of claim 8, wherein the WUR discovery frame comprises an identifier of the WLAN, which the recipient electronic device previously joined; and
wherein the recipient electronic device makes a roaming decision based at least in part on the identifier.

13. The computer-readable storage medium of claim 8, wherein the WUR discovery frame comprises a compressed or a partial identifier associated with the electronic device or the WLAN.

14. The computer-readable storage medium of claim 8, wherein the WUR discovery frame has a different length than another WUR discovery frame associated with the electronic device.

15. A method for performing additional discovery, comprising:
by a recipient electronic device:
receiving, by a wake-up radio (WUR) in an interface circuit in the recipient electronic device, a WUR discovery frame associated with an electronic device, wherein the WUR discovery frame comprises an identifier of an operating class of a wireless local area network (WLAN) that includes the electronic device, wherein the operating class uniquely specifies a regulatory domain and a channel set of the WLAN, and the channel set comprises multiple possible available channels in the regulatory domain;
selectively transitioning a primary connectivity radio (PCR) in the recipient electronic device from a lower-power mode to a higher-power mode in response to receiving the WUR discovery frame; and
performing the additional discovery associated with the electronic device using the PCR, wherein the additional discovery comprises a scan for at least a channel associated with the WLAN based at least in part on the channel set.

16. The method of claim 15, wherein the electronic device comprises an access point.

17. The method of claim 15, wherein the WUR discovery frame is compatible with an IEEE 802.11 communication protocol.

18. The method of claim 15, wherein the scan involves a scan of channels in the channel set.

19. The method of claim 15, wherein the WUR discovery frame comprises an identifier of the WLAN, which the recipient electronic device previously joined; and
wherein the recipient electronic device makes a roaming decision based at least in part on the identifier.

20. The method of claim 15, wherein the WUR discovery frame comprises a compressed or a partial identifier associated with the electronic device or the WLAN.

* * * * *